US009742658B2

(12) United States Patent
Brown et al.

(10) Patent No.: US 9,742,658 B2
(45) Date of Patent: Aug. 22, 2017

(54) INTER-MEDIUM BRIDGING WITH INTER-DOMAIN ROUTING AND MULTI-MEDIUM DOMAIN COORDINATION

(71) Applicant: Metanoia Communications Inc., Hsinchu (TW)

(72) Inventors: Terry Cris Brown, Austin, TX (US); Ravi Mantri, Portland, OR (US); Kun-I Chen, Hsinchu (TW); WuLung Hsu, Hsinchu (TW)

(73) Assignee: METANOIA COMMUNICATIONS INC., Hsinchu (TW)

( * ) Notice: Subject to any disclaimer, the term of this patent is extended or adjusted under 35 U.S.C. 154(b) by 0 days.

(21) Appl. No.: 14/881,503

(22) Filed: Oct. 13, 2015

(65) Prior Publication Data

US 2016/0036687 A1    Feb. 4, 2016

Related U.S. Application Data

(60) Division of application No. 14/049,200, filed on Oct. 8, 2013, which is a continuation-in-part of application No. 13/907,654, filed on May 31, 2013, now Pat. No. 9,191,309.

(51) Int. Cl.
| H04L 12/28 | (2006.01) |
| H04L 12/715 | (2013.01) |
| H04W 88/16 | (2009.01) |
| H04W 40/00 | (2009.01) |
| H04L 12/721 | (2013.01) |
| H04L 12/46 | (2006.01) |

(52) U.S. Cl.
CPC .......... *H04L 45/04* (2013.01); *H04L 12/4625* (2013.01); *H04L 45/66* (2013.01); *H04W 40/00* (2013.01); *H04W 88/16* (2013.01)

(58) Field of Classification Search
CPC ...... H04W 88/16; H04W 40/00; H04L 45/66; H04L 45/04; H04L 12/4625
USPC .......................................... 370/401
See application file for complete search history.

(56) References Cited

U.S. PATENT DOCUMENTS

| 5,541,922 | A | 7/1996 | Pyhalammi | |
| 5,717,687 | A * | 2/1998 | Minot | H04Q 3/665 370/257 |
| 5,757,795 | A | 5/1998 | Schnell | |
| 2005/0213547 | A1 * | 9/2005 | Meier | H04L 12/4625 370/338 |
| 2010/0191859 | A1 | 7/2010 | Raveendran | |

(Continued)

*Primary Examiner* — Sai-Ming Chan
(74) *Attorney, Agent, or Firm* — Han IP Corporation; Andy M. Han

(57) ABSTRACT

Various embodiments of inter-medium bridging are described. In one aspect, a method may involve a plurality of inter-domain bridging devices transmitting a message that describes inter-domain routing capability of the inter-domain bridging devices to a respective domain master of each of a plurality domains to which the inter-domain bridging devices are connected. The method may also involve the plurality of domain masters exchanging messages that describe the inter-domain routing capability of the plurality of inter-domain bridging devices connected to the respective domain of each domain master. The method may further involve each domain master determining one of the domain masters to serve as a global domain master for calculating inter-domain routing paths.

11 Claims, 18 Drawing Sheets

(56) References Cited

U.S. PATENT DOCUMENTS

| | | | |
|---|---|---|---|
| 2012/0226901 A1* | 9/2012 | Pandey | H04L 12/283 713/150 |
| 2014/0233576 A1* | 8/2014 | Vazquez | H04L 49/25 370/400 |

* cited by examiner

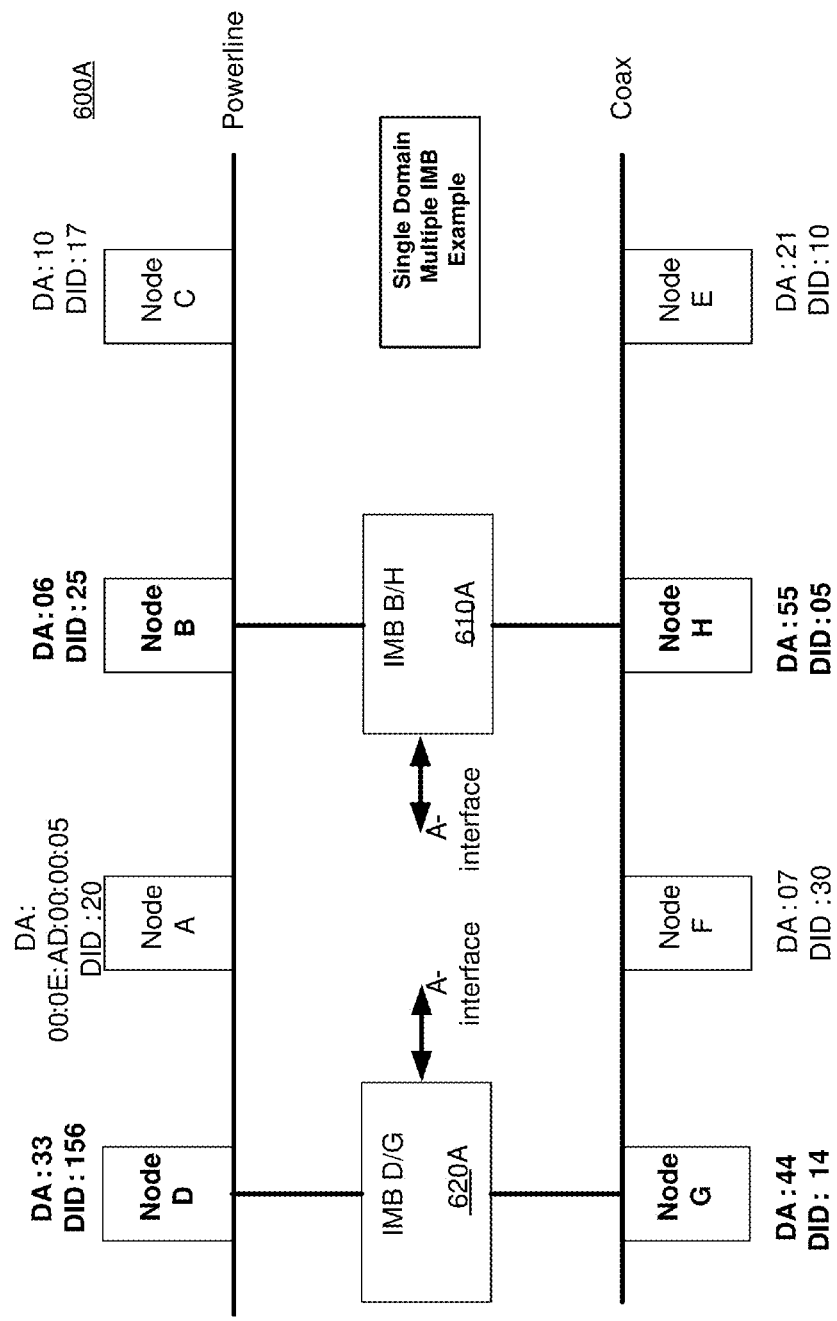

1000

BRIDGE, BY A FIRST INTER-MEDIUM BRIDGING DEVICE, COMMUNICATIONS BETWEEN A PLURALITY OF PHYSICAL MEDIUMS OF A NETWORK CONNECTED TO THE FIRST INTER-MEDIUM BRIDGING DEVICE AT THE DLL LAYER OF THE OSI MODEL
1002

FACILITATE COMMUNICATIONS BETWEEN AN EXTERNAL DEVICE AND THE NETWORK THROUGH AN APPLICATION INTERFACE OF THE FIRST INTER-MEDIUM BRIDGING DEVICE
1004

INTER-MEDIUM BRIDGING WITH INTER-DOMAIN ROUTING AND MULTI-MEDIUM DOMAIN COORDINATION

CROSS REFERENCE TO RELATED PATENT APPLICATION

This is a divisional application of U.S. patent application Ser. No. 14/049,200, filed on 8 Oct. 2013, which is a continuation-in-part application claiming the priority benefit of U.S. patent application Ser. No. 13/907,654, filed 31 May 2013 and entitled "Inter-Medium Bridging With Inter-Domain Routing And Multi-Medium Domain Coordination." These applications are herein incorporated by reference in their entirety.

BACKGROUND

Technical Field

The present disclosure relates to the field of digital communication and, more specifically, to digital communication across multiple mediums.

Description of Related Art

The home networking technology family of standards developed under the International Telecommunication Union's Telecommunication Standardization sector (ITU-T G.hn) and IEEE P1905.1 standards describe a home networking environment in which multiple types of mediums may be used for communications. In both standards, access to each medium requires a complete medium specific transceiver. Bridging between mediums is performed using a switching function that is based on Ethernet or another protocol. In the device 100 shown in FIG. 1, the transceivers A, B and C are made up of a Data Link Layer (DLL) and physical layer (PHY) interface in accordance with the Open Systems Interconnection (OSI) model (ISO/IEC 7498-1) at the International Organization for Standardization. These transceivers can communicate with their respective mediums simultaneously.

In the case of the G.hn standard, the four supported medium types are power line, phone line, coaxial cable (baseband and RF coax) and POF (plastic optical fiber). The device 100 shown in FIG. 1 could be used as a G.hn defined Inter-Domain Bridge (IDB). Domains are used in G.hn to group devices that can communicate using the G.hn PHY and DLL/MAC protocols under the direction of a Domain Master (DM). Since devices in the same domain are usually able to communicate directly by passing signals at the physical layer, a domain is typically composed of devices that are attached to the same medium. Therefore, an IDB can be used to connect different mediums in a G.hn network. The IDB bridging function can be accomplished using an IEEE 802.1 Ethernet switch or some other bridging function such as that defined by the P1905.1 standard. The switch could also provide an Ethernet interface to an application that was attached directly to the IDB device 100 as shown in FIG. 1.

With multiple domains and traffic across the multiple domains, inter-domain routing is required. Regarding inter-domain routing, routing loops can form when multiple IDBs are connected to different mediums in a home network. These loops can also occur when multiple IDBs connect between the same two mediums. Also, more complex loops can be formed between more than two mediums or more than two domains. Inside a single domain it is the DM's responsibility to prevent routing loops by defining the broadcast relay tree. However, when multiple domains are involved this approach would require complex interaction between the multiple DMs.

SUMMARY

Various embodiments pertaining to techniques, processes, algorithms and devices related to inter-medium bridging with inter-domain routing and multi-medium domain coordination are described herein. The techniques or algorithms may be implemented in software, firmware, hardware, or any combination thereof.

In one aspect, a method may include bridging, by a first inter-medium bridging device, communications between a plurality of mediums of a network connected to the first inter-medium bridging device at the Data Link Layer (DLL) of the Open Systems Interconnection (OSI) model. The plurality of mediums may include at least a first medium and a second medium that comprise separate communications channels.

In at least some embodiments, each of the first medium and the second medium may include a coaxial line medium that is radio frequency (RF), a coaxial line medium that is baseband, a power line medium, a phone line medium, or a plastic optical fiber.

In at least some embodiments, the first medium and the second medium may include different frequency bands on a same physical medium.

In at least some embodiments, the first medium and the second medium may include different two wire combinations of a three-wire power line medium.

In at least some embodiments, the first medium and the second medium may include different physical mediums of a same type that are not electrically connected to one another.

In at least some embodiments, the first medium and the second medium may include a same physical medium such that a first communication channel on the first medium and a second communication channel on the second medium are at least partially isolated from one another by some amount of signal loss.

In at least some embodiments, bridging may include bridging at least two of the physical mediums in one G.hn domain.

In at least some embodiments, the method may further include functioning, by the first inter-medium bridging device, as a respective G.hn domain master for at least one of the plurality of physical mediums.

In at least some embodiments, the method may further include scheduling, by the first inter-medium bridging device, transmission of data between the plurality of physical mediums by one of the physical mediums at a time.

In at least some embodiments, the method may further include communicating, by the first inter-medium bridging device, as a G.hn node on one of the physical mediums at a given time.

In at least some embodiments, the first inter-medium bridging device may include a multi-input multi-output (MIMO) inter-medium bridging device in accordance with the ITU-T G.hn standards.

In at least some embodiments, the first inter-medium bridging device may be configured to simultaneously transmit and receive packets over two or more independent single-output single-input (SISO) physical interfaces, each interface connected to a different communication channel, when the two or more independent SISO physical interfaces are not configured for MIMO operation.

In at least some embodiments, the method may further include operating, by the first inter-medium bridging device, as a respective node on each of more than one of the physical mediums as one node per medium at a given time.

In at least some embodiments, the method may further include operating, by the first inter-medium bridging device, as a G.hn Medium Access Plan (MAP) relay and a registration proxy such that domain masters are allowed to register nodes and propagate MAP scheduling information to one or more other mediums. In at least some embodiments, the method may additionally include operating, by the first inter-medium bridging device, as a G.hn authentication proxy such that a security controller on the first medium is able to authenticate nodes on one or more other mediums connected to the first inter-medium bridging device.

In at least some embodiments, the method may include storing, in an address association table (AAT) of the first inter-medium bridging device, an association of a destination identifier (DID) and an Ethernet destination address (DA) of at least one other node to one or more of the physical mediums to which the at least one other node is attached. In at least some embodiments, an entry of the AAT maintained by the first or another inter-medium bridging device may include: a first field that stores the DA of the at least one other node; a second field that stores the DID of the at least one other node; a third field that indicates whether the DA of the at least one other node is associated with a G.hn domain to which the first or the another inter-medium bridging device belongs; a fourth field that indicates whether the DA is above the application interface of the first or the another inter-medium bridging device; a fifth field that indicates whether the DA is associated with a G.hn multicast stream and whether the DID is interpreted as a multicast identifier (MID); and a sixth field that indicates which one or more physical mediums the DA resides on.

In at least some embodiments, the method may further include: detecting, by the first inter-medium bridging device, a loop formed by a second inter-medium bridging device that is connected to two domains to which the first inter-medium bridging device is connected; and performing either or both of: disabling forwarding of broadcast packets between domains; and disabling reporting to a domain master of specific unicast routes in a local address association table (AAT) of the first inter-medium bridging device in response to the first inter-medium bridging device determining that a loop would be formed by including the unicast routes. In at least some embodiments, detecting a loop may include implicitly detecting a loop by: examining, by the first inter-medium bridging device, AAT entries of other nodes for duplicate Media Access Control (MAC) entries that are also in the local AAT of the first inter-medium bridging device; removing, by the first inter-medium bridging device, a duplicate MAC address in response to the duplicate MAC address being listed in the AAT of at least one of the other nodes and in the local AAT of the first inter-medium bridging device; and transmitting, by the first inter-medium bridging device, a topology update to a first domain master, the topology update including local AAT entries of the first inter-medium bridging device containing MAC addresses that do not also exist in AAT entries of other nodes. In at least some embodiments, the topology update may include an indication that the first inter-medium bridging device is connected to one or more other domain. In at least some embodiments, upon detecting a loop, the first inter-medium bridging device may re-evaluate the loop each time a domain master (DM) routing update is received.

Moreover, upon detecting that conflicting MAC addresses in the AAT entries for other nodes have been removed in the routing update, the first inter-medium device may wait for a random amount of time and add the conflicting MAC addresses to a topology update sent to the DM if another node does not add the conflicting MAC addresses before a random amount of time expires.

In at least some embodiments, the method may further include: detecting, by a first domain master, a loop formed by multiple inter-medium bridging devices that are connected to a respective domain of the first domain master by examining local AAT entries for all nodes to find MAC addresses that are included in address association tables (AAT) of multiple nodes; and performing either or both of: instructing one or more inter-medium bridging devices to disable forwarding of broadcast packets between domains if a loop exists; and removing, via a routing update message, a particular route to a MAC address located in another domain from a first inter-medium bridging device if the particular route also exists to the same MAC address through a second inter-medium bridging device.

In at least some embodiments, the method may further include: receiving, by the first inter-medium bridging device, a topology update request message from the first domain master requesting for cross-domain topology information; and transmitting, by the first inter-medium bridging device, a topology update confirmation message to the first domain master, the topology update confirmation message comprising information indicative of: a type of inter-medium bridging device of the first inter-medium bridging device; a respective domain ID of each of the connected one or more other domain; a respective MAC address of the domain master of each of the connected one or more other domain; a metric that defines a cost for routing to each domain associated with the first inter-medium bridging device; a list of MAC addresses that resides above the application interface of the first inter-medium bridging device; and a list of MAC addresses that belong to each domain when more than one other domain is connected to the first inter-medium bridging device.

In at least some embodiments, the method may further include: receiving, by the first inter-medium bridging device, a routing message from the first domain master, the routing message including a topology update; and enabling, by the first inter-medium bridging device, broadcast forwarding in response to all domain crossing routes of the first inter-medium bridging device being included in the routing message and no loop-forming route being included for another node.

In at least some embodiments, the method may further include: identifying, by the first inter-medium bridging device, one or more conflicting MAC address indicated by the first domain master to be attached to the first inter-medium bridging device and to one or more other inter-medium bridging devices; and enabling, by the first inter-medium bridging device, broadcast forwarding in response to routes of the first inter-medium bridging device being included in the routing message and no loop-forming route being included for another node.

In at least some embodiments, the method may further include: enabling, by the first inter-medium bridging device, the forwarding of broadcast packets from a first domain to a second domain when: a loop is detected but not all conflicting MAC addresses are removed by the second inter-medium bridging device; and the first inter-medium device has a lowest bit reversed MAC address of inter-medium bridging devices involved in the loop.

In at least some embodiments, detecting a loop may include explicitly detecting a loop by: transmitting, by the first inter-medium bridging device, a predefined indication to each of a plurality of domains to which the first inter-medium bridging device is connected; receiving, by the first inter-medium bridging device, a predefined response from at least one node of at least one other inter-medium bridging device on at least one of the domains; and exchanging, by the first inter-medium bridging device, network topology messages with the at least one other inter-medium bridging device.

In at least some embodiments, the predefined indication may include the DID and one or more DAs of the first inter-medium bridging device.

In at least one embodiment, the DA included in the predefined indication is the DA of a node of the first inter-medium bridging device, the node of the first inter-medium bridging device being associated with the domain or the medium on which the predefined indication is transmitted.

In at least one embodiment, all the DAs of the nodes of the first inter-medium bridging device are included in the predefined indication.

In at least some embodiments, the predefined response may include the DID and one or more DAs of the at least one other inter-medium bridging device.

In at least one embodiment, the DA included in the predefined response is the DA of a node of the at least one other inter-medium bridging device, the node of the at least one other inter-medium bridging device being associated with the domain or the medium on which the predefined response is transmitted.

In at least one embodiment, all the DAs of the nodes of the at least one other inter-medium bridging device are included in the predefined response.

In at least some embodiments, the network topology messages may include a list of MAC addresses that are connected to an A-interface of the first inter-medium bridging device and a list of MAC addresses in other domains that can be directly reached via the first inter-medium bridging device without going through additional inter-domain inter-medium bridging devices.

In at least some embodiments, the network topology messages may include: a type of inter-domain bridging/inter-medium bridging of the first inter-medium bridging device; a domain ID of one or more domains connected to the first inter-medium bridging device; a metric for each domain, connected to the first inter-medium bridging device, that defines a cost for routing to that domain through the first inter-medium bridging device; and a list of MAC addresses that belong to each domain connected to the first inter-medium bridging device, along with a metric per MAC address that defines a cost for routing to that MAC address through the first inter-medium bridging device.

In at least some embodiments, the type of inter-domain bridging/inter-medium bridging of the first inter-medium bridging device may include a single-PHY IMB, a multi-PHY IMB, a switching IDB, or a routing IDB.

In at least some embodiments, the method may further include: determining, by the first inter-medium bridging device, a shortest path to each MAC address based on a number of inter-medium bridges to be traversed to reach the each MAC address; and reporting to the first domain master a particular route to each MAC address through the first inter-medium device if the particular route through the first inter-medium device is the shortest. Moreover, the method may additionally include: determining, by the first inter-medium bridging device, a particular route through the first inter-medium bridging device to a MAC address which was previously reported to the first domain master and is not the shortest path; and reporting to the first domain master that the particular route is no longer available.

In at least some embodiments, the method may further include: determining, by the first inter-medium bridging device, a shortest path to each MAC address based on comparing the metric communicated by each inter-medium device in the network topology messages; and reporting to the first domain master a particular route to each MAC address through the first inter-medium device if the particular route through the first inter-medium device is the shortest.

In at least some embodiments, the method may further include enabling, by the first inter-medium bridging device, the forwarding of broadcast packets from a first domain to a second domain when no loop is detected or when a loop is detected but the first inter-medium device has the lowest bit reversed MAC address of the inter-medium bridging devices involved in the loop.

In at least some embodiments, each of the plurality of physical mediums may operate as a respective G.hn domain.

In at least some embodiments, the method may further include relaying, by the first inter-medium bridging device, messages between domains by: modifying an Originating-Node field of a Logical Link Control (LLC) frame header of a message in the first domain to match a device identifier (DID) of the first inter-medium bridging device in the second domain; modifying a DestinationNode field of the LLC frame header of the message to match a DID of the destination node in the second domain; and transmitting the message in the second domain when a transmission opportunity exists. Moreover, the method may further include: decrypting, by the first inter-medium device, a message based on an encryption key associated with the first domain; and encrypting, by the first inter-medium device, the message based on an encryption key associated with the second domain before transmitting the message in the second domain.

In at least some embodiments, at least one of the plurality of physical mediums may be associated with a node of the first inter-medium bridging device, and the first inter-medium bridging device may have an Ethernet address that is used as a DA of the node.

In at least some embodiments, at least one of the plurality of physical mediums may be associated with a node of the first inter-medium bridging device, and the node may have an Ethernet address that is used as a DA of the node.

In at least some embodiments, the method may further include storing, in an AAT of at least one node of the first inter-medium bridging device, an association of a DID an Ethernet DA of at least one other node to one or more of the physical mediums to which the at least one other node is attached.

In at least some embodiments, an entry of the AAT maintained by at least one node of the first or another inter-medium bridging device may include: a first field that stores the DA of the at least one other node; a second field that stores the DID of the at least one other node; a third field that indicates whether the DA of the at least one other node is associated with a G.hn domain to which the node of the first or the another inter-medium bridging device belongs; a fourth field that indicates whether the DA is above the application interface of the node of the first or the another inter-medium bridging device; a fifth field that indicates whether the DA is associated with a G.hn multicast stream and whether the DID is interpreted as an MID; and a sixth field that indicates which one or more physical mediums the DA resides on.

In at least some embodiments, the method may further include enabling, by the first inter-medium bridging device, the forwarding of broadcast packets from a first domain to a second domain when: a loop is detected but not all conflicting MAC addresses are removed by the second inter-medium bridging device; and one of the nodes of the first inter-medium device has a lowest bit reversed MAC address of the nodes of the inter-medium bridging devices involved in the loop.

In at least some embodiments, the method may further include enabling, by the first inter-medium bridging device, the forwarding of broadcast packets from a first domain to a second domain when no loop is detected or when a loop is detected but one of the nodes of the first inter-medium device has the lowest bit reversed MAC address of the nodes of the inter-medium bridging devices involved in the loop.

In another aspect, a method may include: receiving, by a first domain master associated with a first domain, information indicative of a Media Access Control (MAC) cycle of a second domain associated with a second domain master connected by a medium bridging device, the first domain and the second domain being associated with a first medium and a second medium that comprise separate communications channels; and aligning, by the first domain master, a MAC cycle of the first domain with the MAC cycle of the second domain in response to the second domain comprising a power line medium and the first domain comprising a medium other than the power line medium.

In at least some embodiments, the method may further include: tracking, by the inter-medium bridging device, network timing references (NTR) of a plurality of domains connected to the inter-medium device; and transmitting, by the inter-medium bridging device, timing information to each of the domain masters of the plurality of domains, the timing information including an offset indicative of a difference between the network timing reference of that domain and one or more other domains, a starting network timing reference value for the MAC cycle of one or more other domains, and a duration of the MAC cycle of one or more other domains. The inter-medium bridging device may be registered in the plurality of domains.

In at least some embodiments, the aligning the MAC cycle of first domain to the MAC cycle of a second domain may include: determining, by the first domain master, a periodic start and end times of the MAC cycle of the second domain based on the timing information sent from the inter-medium device; and adjusting, over one or more MAC cycles by the first domain master, the MAC cycle of the first domain to match a periodic start and end times of the MAC cycle of the second domain.

In at least some embodiments, the method may further include aligning, by the first domain master, the MAC cycle of the first domain with the MAC cycle of the second domain and a MAC cycle of one or more additional domains associated with one or more additional domain masters using a neighborhood domain MAC cycle alignment method of the G.9961 standards in response to each of the first domain, the second domain, and the one or more additional domains comprising a respective power line medium.

In at least some embodiments, the method may further include aligning, by the first domain master, the MAC cycle of the first domain with the MAC cycle of the second domain or a MAC cycle of one or more additional domains in response to each of the second domain and the one or more additional domains comprising a respective power line medium while the first domain does not comprise a power line medium.

In at least some embodiments, the method may further include aligning, by the first domain master, the MAC cycle of the first domain to the MAC cycle of the second domain whichever has a longer duration in response to none of the domains comprising a power line medium.

In at least some embodiments, the method may further include aligning, by the first domain master, the MAC cycle of the first domain with the MAC cycle of the second domain whichever has the lowest bit reversed MAC address for the respective domain master in response to a duration of the MAC cycle of the first domain and a duration of the MAC cycle of the second domain being equal when neither the first domain nor the second domain comprises a power line medium.

In yet another aspect, a method may include: transmitting, by a plurality of inter-domain bridging devices, a message that describes inter-domain routing capability of the inter-domain bridging devices to a respective domain master of each of a plurality domains to which the inter-domain bridging devices are connected; exchanging, by the plurality of domain masters, messages that describe the inter-domain routing capability of the plurality of inter-domain bridging devices connected to the respective domain of each domain master; and determining, by each domain master, one of the domain masters to serve as a global domain master for calculating inter-domain routing paths.

In at least some embodiments, the messages exchanged may include: a type of inter-domain bridge (IDB)/inter-medium bridge (IMB) indicative of a single-PHY IMB, a multi-PHY IMB, a switching IDB, or a G.hn routing IDB; a domain identifier of one or more connected domains; a MAC address of each of the connected one or more domain masters; a metric that defines a cost for routing to each domain of an IMB that sends one of the messages; a list of MAC addresses for an IMB that resides above an application interface rather than in a connected G.hn domain; and if more than one connected domain, a list of MAC addresses that belong to each domain.

In at least some embodiments, the global domain master may be configured to perform operations including: calculating, based on inter-domain metrics provided by each inter-domain bridging device, a lowest-cost path for routing between each pair of domains; selecting lowest-cost inter-domain routes; and communicating the selected lowest-cost inter-domain routes to each domain master.

In at least some embodiments, the global domain master may be further configured to perform operations including: determining a fully connected inter-domain broadcast routing tree that does not form loops; and communicating to each domain master broadcast forwarding requirements for each inter-domain bridging device connected to the respective domain of the domain master.

In at least some embodiments, the global domain master may be configured to perform operations including: calculating, based on inter-domain routing metrics provided by each inter-domain bridging device and intra-domain routing metrics provided by each domain master, a lowest-cost path for routing between each pair of nodes located in different domains; selecting lowest-cost inter-domain routes; and communicating to each domain master the selected lowest-cost inter-domain routes.

In at least some embodiments, the global domain master may be further configured to perform operations including: determining a fully connected inter-domain broadcast routing tree that does not form loops originating from each node in the plurality of domains; and communicating to each domain master broadcast forwarding requirements for each inter-domain bridging device connected to the respective domain of the domain master for broadcast messages that originate from each node of the respective domain.

This summary is provided to introduce concepts and techniques related to inter-medium bridging with inter-domain routing and multi-medium domain coordination capabilities. Some embodiments of the techniques are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the present disclosure.

FIG. 6A is a diagram showing inter-medium bridging with multiple inter-medium bridges in accordance with another embodiment of the present disclosure.

FIG. 10 is a flowchart of a process 1000 of inter-medium bridging including inter-domain routing in accordance with an embodiment of the present disclosure.

DETAILED DESCRIPTION OF PREFERRED EMBODIMENTS

Overview

In order to provide high speed coverage to all parts of a home, modern home networking systems are moving toward heterogeneous environments. In these environments the network is built up using multiple communication mediums so that the best medium can be used for each connected device. In the case of ITU G.hn (standard 9960/9961/9962/9963), all in-home wiring mediums are supported, namely: phone line, power line, coaxial cable (both baseband and RF) and POF. Since these different types of mediums cannot be physically connected to propagate signals, the G.hn standard defines mechanisms for a device connected to multiple mediums to provide bridging between those mediums. However, the mechanism defined in the standard, known as the Inter-Domain Bridge (IDB), requires the bridging to occur at the Ethernet layer using an Ethernet switch. The present disclosure provides a more-efficient bridging mechanism that occurs within the G.hn DLL layer. This mechanism is herein referred to as an Inter-Medium Bridge (IMB).

Example Embodiments of Inter-Domain Bridging

Figure 2:
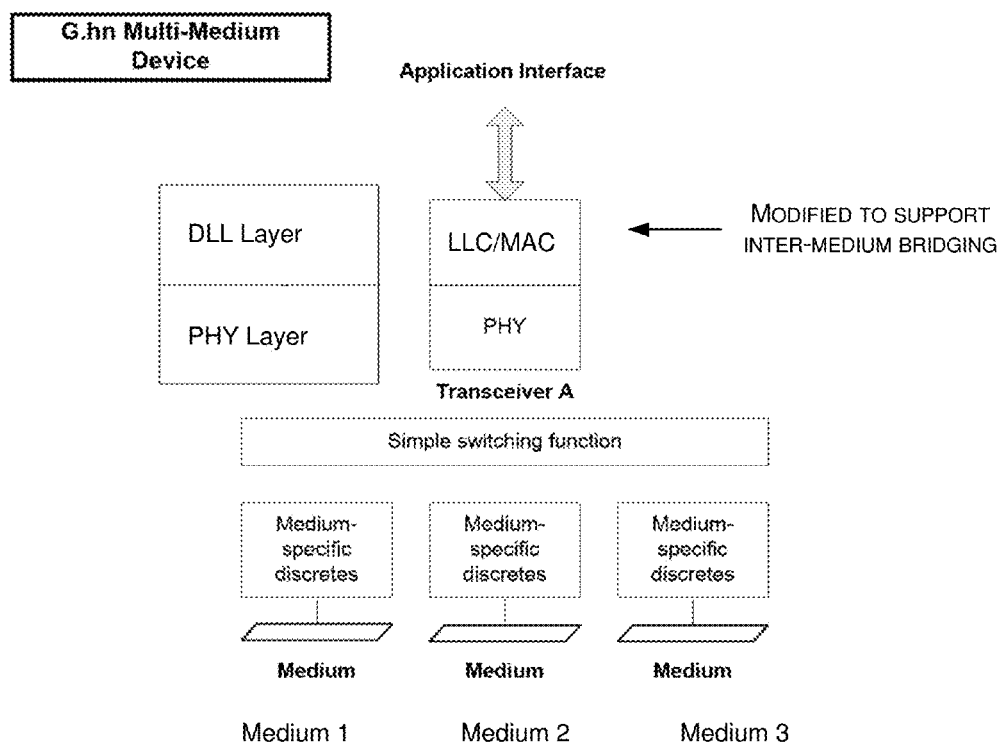
FIG. 2 is a diagram showing architecture of inter-medium bridging in accordance with an embodiment of the present disclosure.

FIG. 2 illustrates architecture 200 of inter-medium bridging using one transceiver in accordance with an embodiment of the present disclosure.

In the G.hn standard the DLL layer is largely independent of the medium that is used. However, the PHY layer has different configurations for each medium. For this reason the transceiver needs some amount of configuration change in order to switch between mediums. According to a technique of the present disclosure, the DLL layer is modified to provide a bridging function between the different mediums. In the architecture 200 shown in FIG. 2, since the device communicates over one medium at a time, the DLL layer stores inter-medium messages received from one medium until it can transmit them on the other medium. This inter-medium routing can be accomplished using a modified version of the packet relaying function that is defined in the G.hn standard. The term "message" and "packet", and the plural forms thereof, are used interchangeably throughout the present disclosure.

The architecture 200 shown in FIG. 2 as modified according to the present disclosure is a low cost IMB. However, since the device communicates with one medium at a time, the Domain Master (DM) for each medium takes the device availability into account when scheduling transactions. The G.hn standard can support this type of scheduling but since DM scheduling is vendor specific and not standard defined, in order to ensure interoperability with legacy devices, the IMB according to the present disclosure may operate as the DM for all mediums to which it is connected. This allows the IMB to schedule both domains appropriately to avoid all conflicts. However, the IMB could also operate as the DM for only one domain without specific support from the other DM for scheduling. This approach will be less complex for the IMB but may result in some reduced scheduling efficiency. The requirement to operate as a DM can be avoided by implementing the IMB using the architecture 300 illustrated in FIG. 3.

Figure 3:
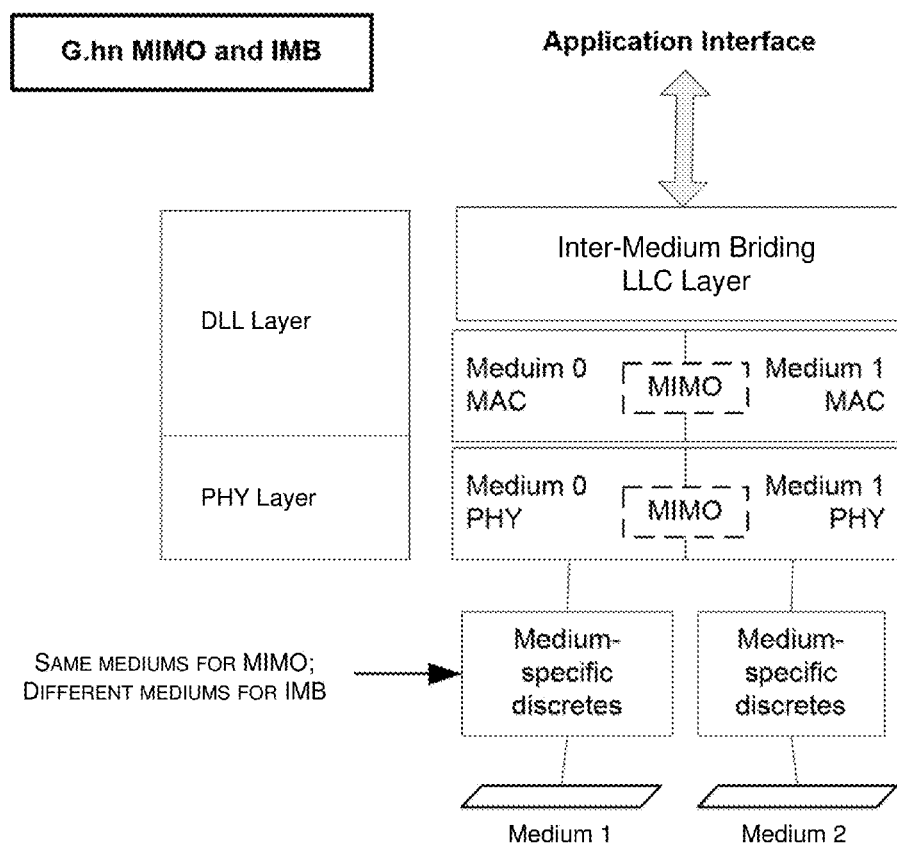
FIG. 3 is a diagram showing architecture of inter-medium bridging in accordance with another embodiment of the present disclosure.

FIG. 3 illustrates architecture 300 of inter-medium bridging in accordance with another embodiment of the present disclosure. It would be appreciated by those ordinarily skilled in the art that, although two mediums/domains are illustrated in the example shown in FIG. 3, the concept and techniques conveyed therein also apply to implementations with more than two mediums/domains.

The architecture 300 depicted in FIG. 3 is that of a dual-function device in accordance with an embodiment of the present disclosure. This device combines the functions of an IMB with that of a G.hn Multi-Input Multi-Output (MIMO) transceiver. G.hn MIMO is used increasingly in home installations where three power line wires are available (P, N, G) to improve the performance and coverage of power line based communications. These improvements are achieved by transmitting and/or receiving packets over two physical channels simultaneously. Implementing MIMO in a G.hn transceiver requires some portions of the PHY layer to be replicated and other portions of the PHY, MAC, and LLC to have increased throughput of up to double the throughput of a non-MIMO device. Although a MIMO device transmits or receives through two channels of the same medium simultaneously, it is an additional increase in complexity to allow the two channels to be independent so that one can transmit while the other receives. Combining the independent PHY/MAC channels with the IMB bridging DLL layer results in an efficient IMB implementation that avoids special scheduling requirements from the DM. The example embodiment shown in FIG. 3 may also be extended to support three or more mediums, with or without the inclusion of the MIMO function. Additionally, when three or more mediums are connected to one IMB (for example, in the extension of either architecture 200 depicted in FIG. 2 or architecture 300 depicted in FIG. 3) some subset of these mediums may operate in the same G.hn domain while other mediums connected to the IMB may operate in different G.hn domains. The techniques described in the present disclosure are applicable to all these cases as well.

Figure 4:
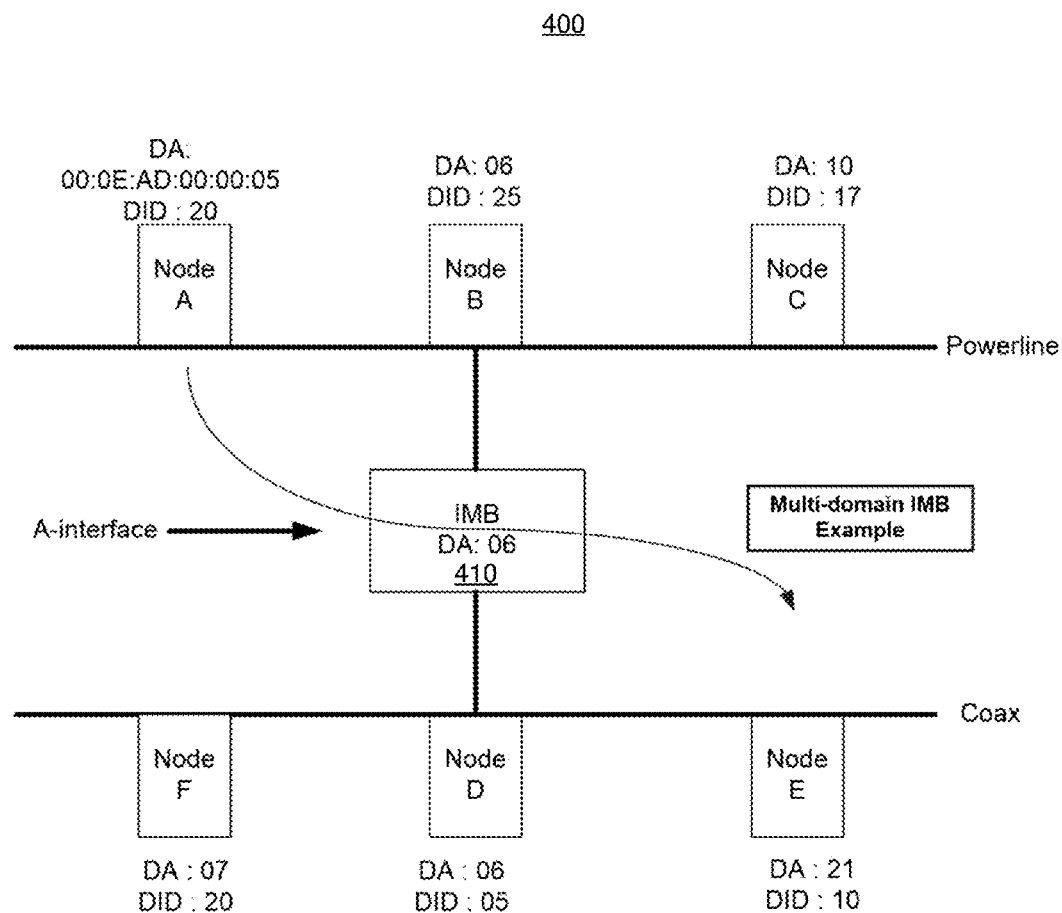
FIG. 4 is a diagram showing inter-medium bridging with one inter-medium bridge in accordance with an embodiment of the present disclosure.

FIG. 4 illustrates a network environment 400 of inter-medium bridging with one inter-medium bridge in accordance with an embodiment of the present disclosure.

Both the architectures 200 and 300 depicted in FIGS. 2 and 3 can be used to bridge between mediums that are operating in different domains as shown in FIG. 4. In the embodiment shown in FIG. 4, an IMB device 410 is used to bridge between the power line and coaxial mediums. Since each medium operates as a separate G.hn domain, the IMB device 410 registers with both domains. In this example the IMB device 410 registers as node B in the power line domain and as node D in the coax domain. When implemented as the embodiment shown in FIG. 2, at any given time the IMB device 410 may communicate as node B on the power line medium or node D on the coax medium. When implemented as the embodiment shown in FIG. 3, the IMB device 410 may communicate as node B and node D simultaneously. In both cases the IMB device 410 may also provide an Application Interface (A-interface) for a connected device to communicate with the G.hn network. In one embodiment, the A-interface utilizes the 802.3 Ethernet protocol.

Referring to FIG. 4, the basic operation of the IMB device 410 is described below. Nodes A, B and C are registered in the power line domain for the power line medium while nodes D, E and F are registered in the coax domain for the coax medium. The IMB device 410 is registered in both domains, as node B in the power line domain and as node D in the coax domain. Each of the nodes A, B, C, D, E and F is assigned an eight-bit destination identification (DID) by the domain master that is unique within the respective domain. As shown in this example, it is possible for nodes in different domains to have the same DID (e.g., nodes A and F each having "20" as its respective DID). Besides the DID, each node also has a unique Ethernet destination address (DA) that is assigned by the device vendor. FIG. 4 shows an example 48-bit Ethernet address that may be assigned for node A. For the remainder of this discussion the DA of each node is shortened to the last byte for convenience, without loss of generality, as shown for the other nodes in FIG. 4. For example, the DA of node A is shortened from "00:0E:AD: 00:00:05" to "05", the DA of node C is shortened to "10", the DA of node E is shortened to "21", the DA of node F is shortened to "07", and so on.

In G.hn, each node maintains a list of DAs along with associations to DIDs. This list, also known as the address association table (AAT), can be used by a node to determine how to route a packet on the G.hn network. For example, in FIG. 4 nodes A and B have an AAT entry that associates DA=10 with DID=17 (with respect to node C). If either node A or B receives a message from its application layer with DA=10, node A or B will use DID=17 to send this packet on the G.hn physical layer network. However, if node A or C receives a message for DA=21, node A or C cannot address it to DID=10 directly since node E is in a different domain and not directly addressable at the G.hn physical layer. Instead, nodes A and C have an AAT entry that associates DA=21 with the IMB device 410 (as node B with DID=25).

The IMB device 410 keeps track of which medium each DA belongs to. This is accomplished by storing the medium information along with each AAT entry. Therefore, in this example the AAT of the IMB device 410 associates DA=5 and DA=10 with the power line medium, and associates DA=7 and DA=21 with the coax medium. When node A or C sends a message, e.g., a packet, to node B with DA=21, the IMB device 410 looks up the AAT entry and see that this particular DA is located on a medium different from the medium from which the message is received. The IMB device 410 then relays the message to the other medium, i.e., the coax medium, whenever there is an opportunity for node D to transmit on that medium. To do this the IMB device 410 modifies the G.hn addressing to point to DID=10. In one embodiment, this relay mechanism may be similar to the relay mechanism defined in G.hn for nodes that cannot directly communicate with each other in the same domain.

In the case of the architecture 200 of FIG. 2, the IMB device 400 operates as either node B or node D, at any given time. In the case of the architecture 300 of FIG. 3, the IMB device 400 operates as both nodes B and D at the same time. As previously mentioned, the latter case gives more scheduling flexibility and allows the IMB device 400 to more easily operate without being the domain master for either domain. The IMB device 400 may also provide higher throughput and/or lower latency for IMB bridging. However, the reduced complexity of the architecture 200 of FIG. 2 makes it an attractive option for implementing the IMB device 400. Ideally, an IMB according to architecture 200 of FIG. 2 would not need to be the domain master for either domain to further reduce the complexity. This may be accomplished if the domain masters for the two domains coordinate their scheduling by synchronizing their Media Access (MAC) cycles. The G.hn standard defines a method to accomplish this for multiple power line domains (neighboring domain protocol). However, such method is not completely suitable for mediums other than power line because the method defined in G.hn relies on the zero-voltage crossing of the AC power supply. Instead, according to a multi-medium domain coordination scheme in accordance with the present disclosure (to be described in a later portion of the present disclosure), the IMB provides a signaling message that may be used by IMB-compatible DMs to synchronize their MAC cycles and avoid conflicts in the IMB node scheduling.

Figure 5:
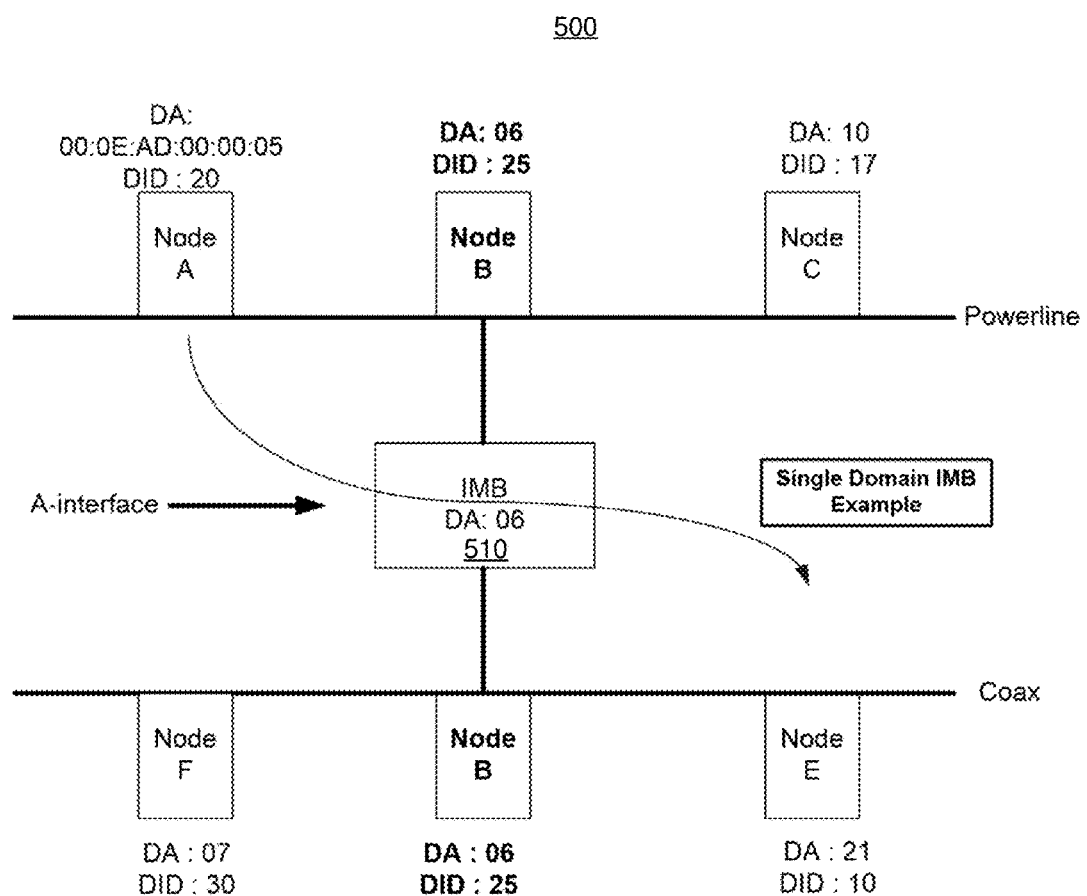
FIG. 5 is a diagram showing inter-medium bridging with one inter-medium bridge in accordance with yet another embodiment of the present disclosure.

FIG. 5 illustrates a network environment 500 of inter-medium bridging with one inter-medium bridge in accordance with another embodiment of the present disclosure.

FIG. 5 shows another example of an IMB device 510 used to bridge two mediums, power line medium and coax medium in the example. In this example both mediums are operated as part of the same G.hn domain. The IMB device 510 has the same address on both mediums and appears to the DM and other nodes as a G.hn relay node. The IMB device 510 also operates as a G.hn MAP relay and registration proxy, thus allowing the DM in one medium to register nodes and propagate MAP scheduling information to the other medium. In this example, nodes A and C can address nodes E and F directly by routing packets through node B. Likewise, nodes E and F can address nodes A and C directly by routing packets through node B. Therefore, the IMB device 510 does not need to modify the addressing in the G.hn LLC Frame Header (LFH) as it relays packets between the mediums. Another advantage of this approach occurs when encryption is used. In the example shown in FIG. 4 it could be necessary for the IMB device 410 to decrypt the packets it needs to relay to the other domain and then re-encrypt them with a security key defined for the other domain. In the example shown in FIG. 5 where a single domain is used, there is no need to modify the encryption since the security keys are known by the source node and destination node within the same domain. Note that when a power line domain is bridged by an IMB, such as the IMB device 510, it is better for the DM to reside on the power line medium. This is true since the power line DM needs to align the MAC cycles to the zero-crossings of the AC power supply. The phone and coax medium do not have this requirement and therefore can easily follow the scheduling of the power line DM. The ability of an IMB defined according to the present disclosure to operate multiple mediums in one G.hn domain is a key advantage of IMB over the G.hn defined IDB.

The preceding examples focus on IMBs that service two mediums. However, there is no restriction in embodiments of the proposed scheme that would limit the application thereof to only two mediums. For G.hn the IMB could support all four mediums (power line, coax, phone line and POF) using the architecture 200 of FIG. 2. Embodiments of the proposed scheme may also be applied to an architecture similar to the architecture 300 of FIG. 3 that included three or more PHY/MAC layers. FIG. 3 represents a special case of this architecture that takes advantage of the additional PHY/MAC/LLC logic that is available to support higher throughput and additional processing in a G.hn MIMO device based on the ITU-T G.9963 standard. Besides extending to three or more mediums, it should be noted that the architecture 300 shown in FIG. 3 may be implemented with various levels of resource sharing in the PHY, MAC, and LLC layers. Only small portions of the PHY need to be dedicated to each medium. Also, if the mediums are operated using the same PHY parameters (OFDM, FEC, etc.) instead of the G.hn medium specific parameters, then there are more opportunities for resource sharing and the architectures according to FIG. 2 or FIG. 3 may be simplified further. This simplification may also simplify DM scheduling, especially for the single domain case shown in FIG. 5.

Figure 4A:
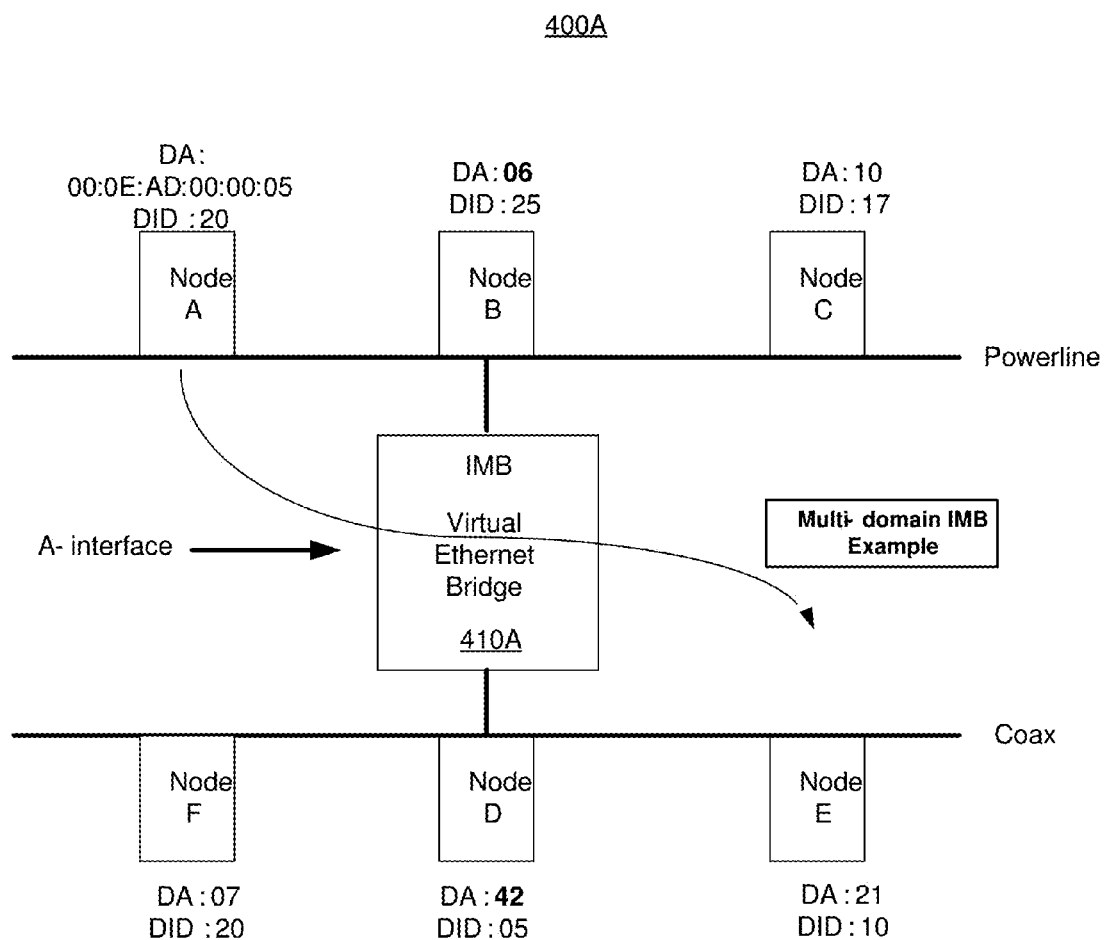
FIG. 4A is a diagram showing inter-medium bridging with one inter-medium bridge in accordance with another embodiment of the present disclosure.

FIG. 4A illustrates another embodiment of the present disclosure. Similar to the embodiment illustrated in FIG. 4, the embodiment in FIG. 4A shows how an IMB device 410A can be used to bridge between two domains on two different mediums. However, in the case of FIG. 4A the IMB device 410A is assigned two Ethernet DAs, one associated with each medium respectively. In the example network the powerline domain side of the IMB device 410A, namely node B, is assigned DID=25 and DA=06 while the coax domain side of the IMB device 410A, namely node D, is assigned DID=05 and DA=42. The IMB device 410A uses the DA associated with each medium, as the source Ethernet address for sending messages that it originates and that are addressed to nodes in the domain corresponding to that medium. Also, the nodes within the domain use the same DA as the Ethernet destination address for sending messages addressed to the IMB device 410A. For example, in FIG. 4A node A would use Ethernet destination address 06 for sending messages addressed to the IMB device 410A. Moreover, IMB device 410A would use Ethernet source address 42 for sending messages addressed to node F. Furthermore, entities above the A-interface of the IMB device 410A can address node B (e.g., management entity for the powerline interface) using Ethernet destination address 06 and node D (e.g., management entity for the coax interface) using Ethernet destination address 42.

Figure 1:
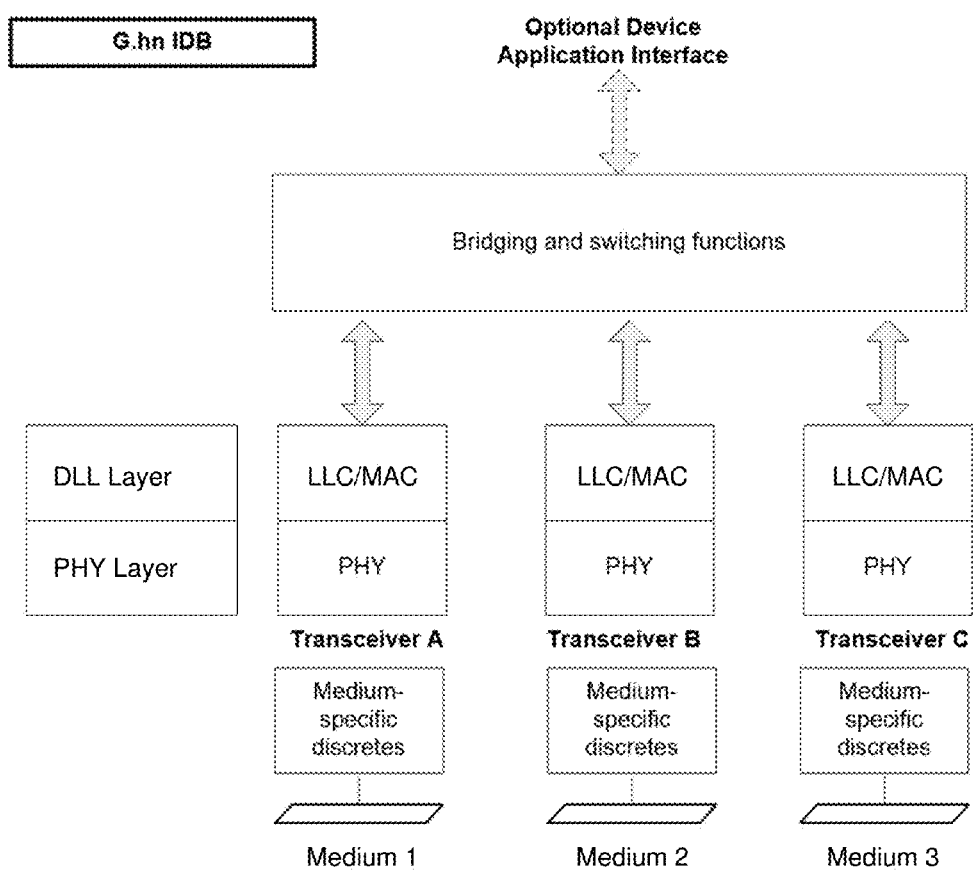
FIG. 1 is a diagram showing inter-domain bridging in a home networking environment according to ITU-T G.hn.

From the perspective of the other nodes in the two domains, the use of different DAs by the IMB (one for each domain instead of using same DA for both domains as in FIG. 4) does not affect the way that packets are routed to the IMB either for forwarding to the other domain or for sending to the IMB's A-interface or both. An IMB used in this manner will appear to the G.hn network to behave the same as a standard defined IDB illustrated in FIG. 1. However, in the case of IMB device 410A, the two Ethernet addresses, DA=06 and DA=42, are virtually bridged by the IMB device 410A and therefore do not require any bridging above the A-interface as required for an IDB. Also, this obviates the need to support two separate A-interfaces, one for each domain, as required for an IDB. The bridging is virtual because it occurs at the G.hn DLL layer rather than the Ethernet layer. This approach retains the advantages of IMB over IDB while providing IDB functionality and also maintaining compatibility with the standard defined IDB device.

Figure 5A:
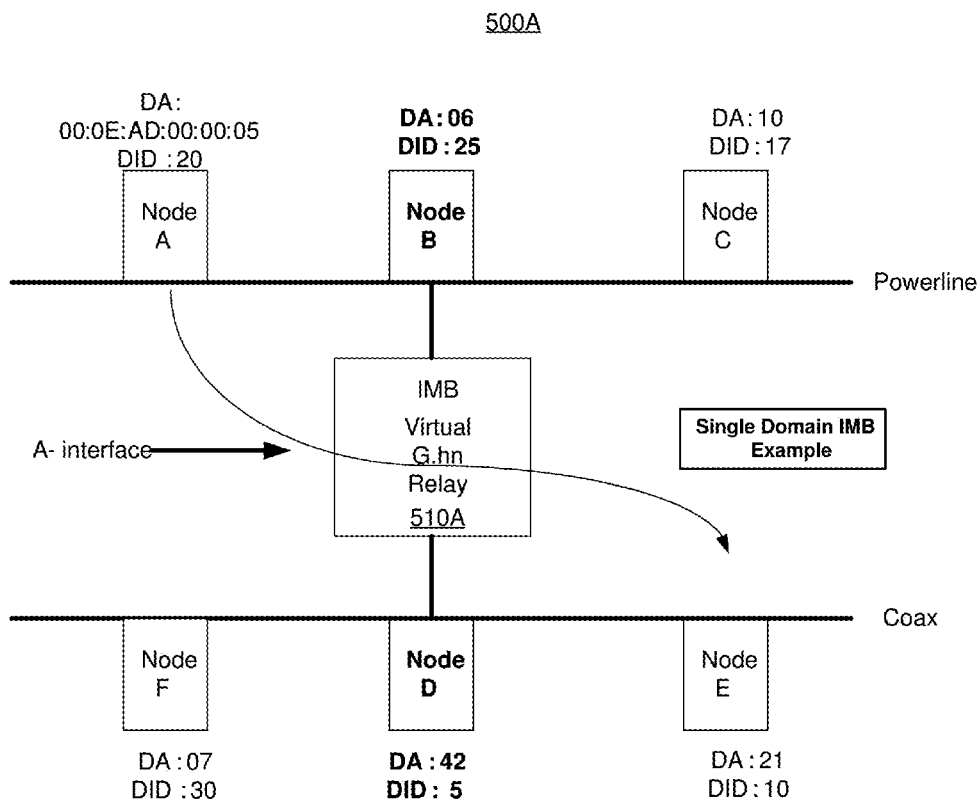
FIG. 5A is a diagram showing inter-medium bridging with one inter-medium bridge in accordance with still another embodiment of the present disclosure.

FIG. 5A illustrates another embodiment of the present invention that uses two Ethernet DAs associated with the IMB device, similar to the embodiment in FIG. 4A. The example network in FIG. 5A is a single domain, multiple medium network similar to the one in FIG. 5. However, in this network the IMB 510A registers with the G.hn domain master as two different nodes, B and D. Therefore, the IMB device 510A is assigned two different DIDs and associates each with a unique DA. In this example node B associates DID=25 with DA=06 and node D associates DID=5 with DA=42. Since IMB device 510A registers in the domain as two nodes and reports the connectivity to the domain master, the domain master views the two nodes as being connected by a G.hn link. Therefore, nodes B and D form a virtual G.hn relay link. Although nodes B and D have separate identities, there is no need to support separate A-interfaces one for each medium. The entities above the common A-interface can either be associated with node B (e.g., part of local AAT on Node B) or with node D (e.g., part of local AAT on node D).

Functionally, if node D receives packets addressed to the entities above the A-interface of the IMB associated with node B then it relays them to node B and vice versa. Since the virtual G.hn relay link does not require an actual transmission on the medium and the relaying can be completed very quickly in the DLL layer of the IMB device 510A, the IMB device 510A can report the maximum link speed between nodes B and D to aid the domain master in scheduling. Alternatively or additionally, if the DM is aware of such IMB devices, the IMB device 510A can indicate the association between nodes B and D when it registers to the DM so that the DM can take that into account when it builds the routing tables, schedules transmissions on the medium(s), establishes end to end flows, computes link metrics etc. The use of two DAs and DIDs in this manner allows both the IMB and domain master to manage the two nodes of the IMB separately and may simplify implementation of the management entity and gain some efficiency since each node is connected to a different medium.

Since the embodiments according to FIGS. 4A and 5A have a different Ethernet DA associated with each medium, they may use the association to gain some additional efficiency at the Ethernet layer. For example, the entities above the A-interface of the IMB device 510A in FIG. 5A can be associated with node B (e.g., include in the local AAT of node B) if they primarily communicate with entities on the powerline medium, and can be associated with node D (e.g., include in the local AAT of node D) if they primarily communicate with entities on the coax medium.

Figure 6:
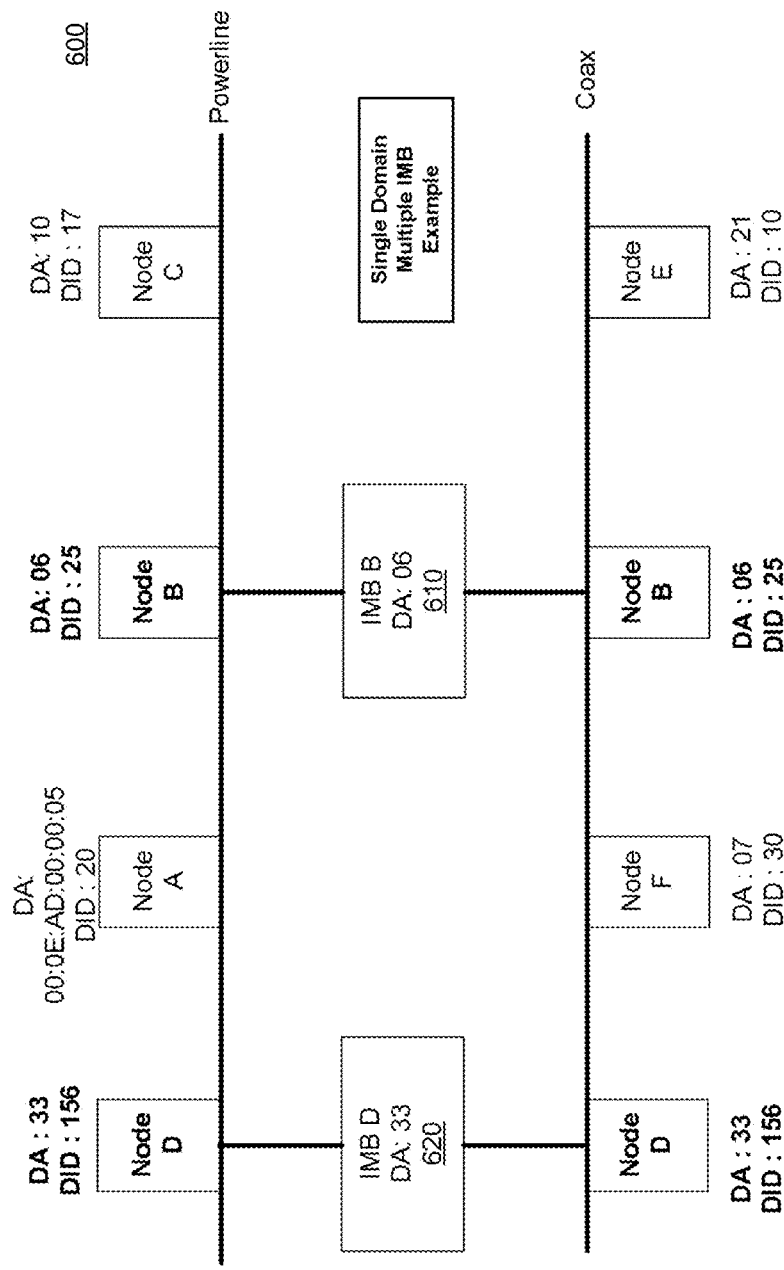
FIG. 6 is a diagram showing inter-medium bridging with multiple inter-medium bridges in accordance with an embodiment of the present disclosure.

FIG. 6 illustrates a network environment 600 of inter-medium bridging with multiple inter-medium bridges in accordance with an embodiment of the present disclosure.

As shown in FIG. 6, the proposed scheme is not limited to one IMB. The use of multiple IMBs opens the possibility of multiple paths to some nodes. The example of FIG. 6 shows the single domain case with two IMB devices 610 and 620. The power line nodes A and C have two options for routing messages to the coax nodes E and F. Since the IMB devices 610 and 620 appear to be normal G.hn relays to the DM, this routing situation is analogous to the routing situation involving relay nodes specified by the G.hn standard. Based on connectivity information the DM informs the nodes of how they can communicate with other nodes. For example, if node C needs to communicate with node E, node C may route one or more packets through node B or D using some criteria to decide which is better. The IMB nodes B and D are directly addressable on either medium. Node C may send a message to node D by addressing it to DID=156 in both the physical layer header (PFH) and the Destination-Node (DN) of the LFH (final destination address). However, physical distances and other impairments make it possible that two nodes on the same medium cannot directly communicate. If this were the case then node C may send the message using another node as a relay. If node B were the relay node it would accomplish this by setting the PFH address to DID=25 (node B) and the LFH DestinationNode to DID=156 (node D). Depending on connectivity and traffic conditions, node B may decide to send the message on either medium to node D. This decision may be statically programmed into the routing for node B and updated periodically as the network changes. Alternatively, such decision may be made dynamically for each message based on the current traffic conditions or some other criteria.

The above description pertains to the case where a node needs to send a message to one other node. A node may also need to broadcast a message to all nodes or multicast a message to some subset of nodes. The G.hn standard handles these cases for domains with multiple connections as in FIG. 6. The DM defines a broadcast relay tree (BRT) that is used to prevent loops from forming and help ensure that every node receives one copy of a broadcast message. Each node filters an incoming broadcast message based on the node that originated it and the node from which the message is received. In this way each node verifies that the message followed the BRT, and drops the message otherwise. A multicast tree works in an analogous fashion. When a link of the BRT includes a path from one IMB device to another, the source IMB device may make the decision about which medium to use as discussed before. Note that the regular nodes and DM are only aware of connectivity to the IMB nodes B and D. Regular nodes and DM are not aware that the IMB nodes exist on two mediums (except in the case of FIG. 2 where the DM is aware of it for scheduling purposes). However, the IMB devices need to keep track of connectivity for both mediums. As previously mentioned, this is accomplished by storing medium information in the AAT.

FIG. 6A illustrates a network environment 600A of inter-medium bridging with multiple inter-medium bridges in accordance with another embodiment of the present disclosure.

The techniques as described above for supporting unicast, multicast and broadcast routing for the example network as shown in FIG. 6 containing multiple IMBs are also applicable to an example network as shown in FIG. 6A, with the difference being registration of the IMBs as two separate nodes in the domain and the presence of an additional G.hn link (virtual) between the two nodes of the IMB as described for FIG. 5A.

Figure 7:
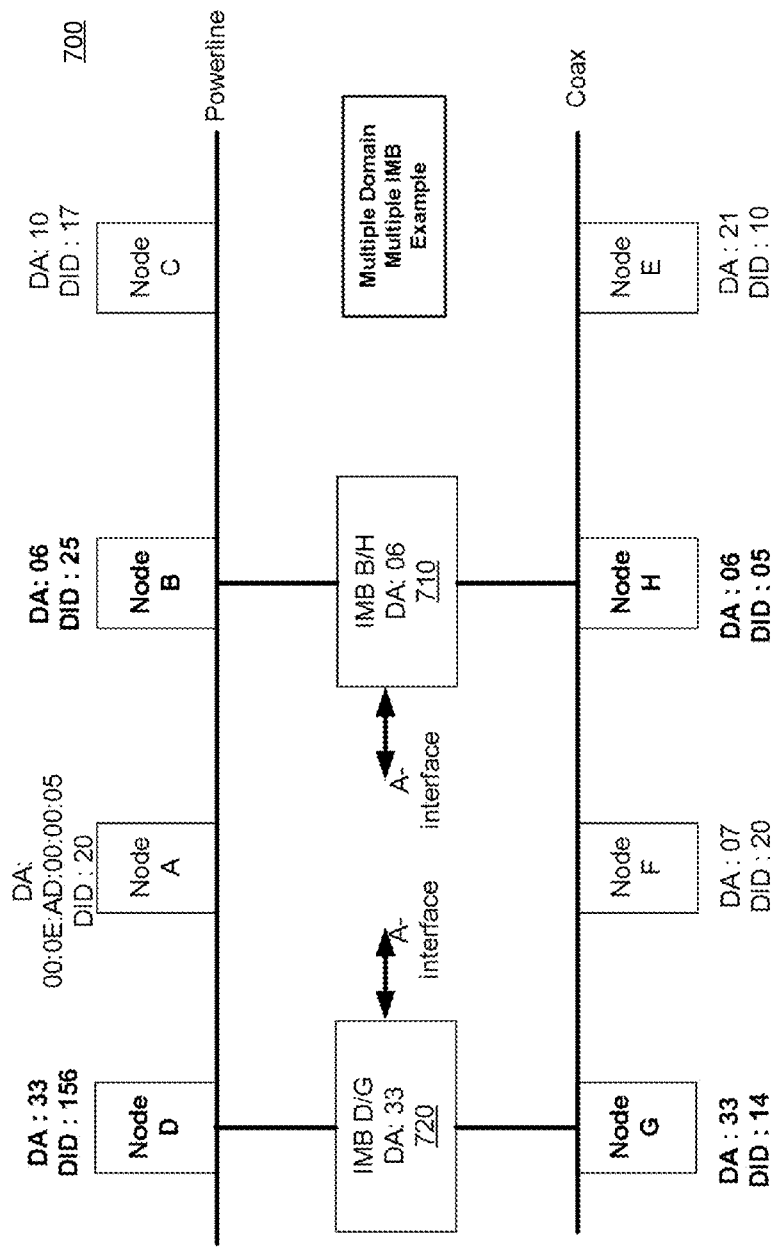
FIG. 7 is a diagram showing inter-medium bridging with multiple inter-medium bridges in accordance with yet another embodiment of the present disclosure.

FIG. 7 illustrates a network environment 700 of inter-medium bridging with multiple inter-medium bridges in accordance with yet another embodiment of the present disclosure.

The multiple-IMB network example shown in FIG. 6 may also be operated with separate G.hn domains for each medium as in the example shown in FIG. 7. Nevertheless, some complications arise in this scenario since the nodes in each domain may not be aware that two IMBs are bridging to the other domain. In G.hn each node notifies the other nodes of which Ethernet DAs are attached to its A-interface. This allows nodes to route packets to the correct node if they receive a packet with that particular DA from its own A-interface. In the case of the IMB device 710 acting as nodes B and H in the example shown in FIG. 7, node B, which is registered in the power line domain, would advertise within its domain that it can connect to all DAs in the coax domain. Similarly, node H, which is registered in the coax domain, would advertise within its domain that it can connect to all DAs in the power line domain. The IMB device 720 acting as nodes D and G may also advertise these connections to the domains of both mediums. In one embodiment, nodes that are not aware of the IMB devices 710 and 720 may choose one of the IMB devices 710 and 720 to relay messages to specific DAs on the other medium. In another embodiment, nodes may decide which of the IMB devices 710 and 720 to use based on some criteria such a link quality or network traffic.

As mentioned previously, the network environment 600 in FIG. 6 avoids problems with routing loops for broadcast and multicast messages by using the G.hn defined BRT for routing. In the network environment 700 of FIG. 7 this approach does not work since the BRT is defined and is applicable within a domain and does not cross the IMB devices 710 and 720. When a broadcast message is received from the A-interface of either IMB device 710 or 720, that device may send that message to all nodes on both mediums. All nodes that receive the broadcast message also forward it to their A-interface. This allows all connected Ethernet devices to be reached by the message. Ideally, if a broadcast message originates from a non-IMB node, the IMB node should forward the message to the other domain so that all Ethernet devices are reached. However, since both IMB devices 710 and 720 in FIG. 7 would receive the message and forward it, the message would be duplicated in the second domain. Worse, the IMB devices 710 and 720 would receive the message from the other IMB device in the second domain and forwarded it back to the first domain. To prevent a run-away loop, the IMB devices 710 and 720 may utilize an algorithm for detecting and avoiding loops to route messages between the multiple domains while avoiding loops. Such an inter-domain routing algorithm will be described later in the present disclosure.

Figure 7A:
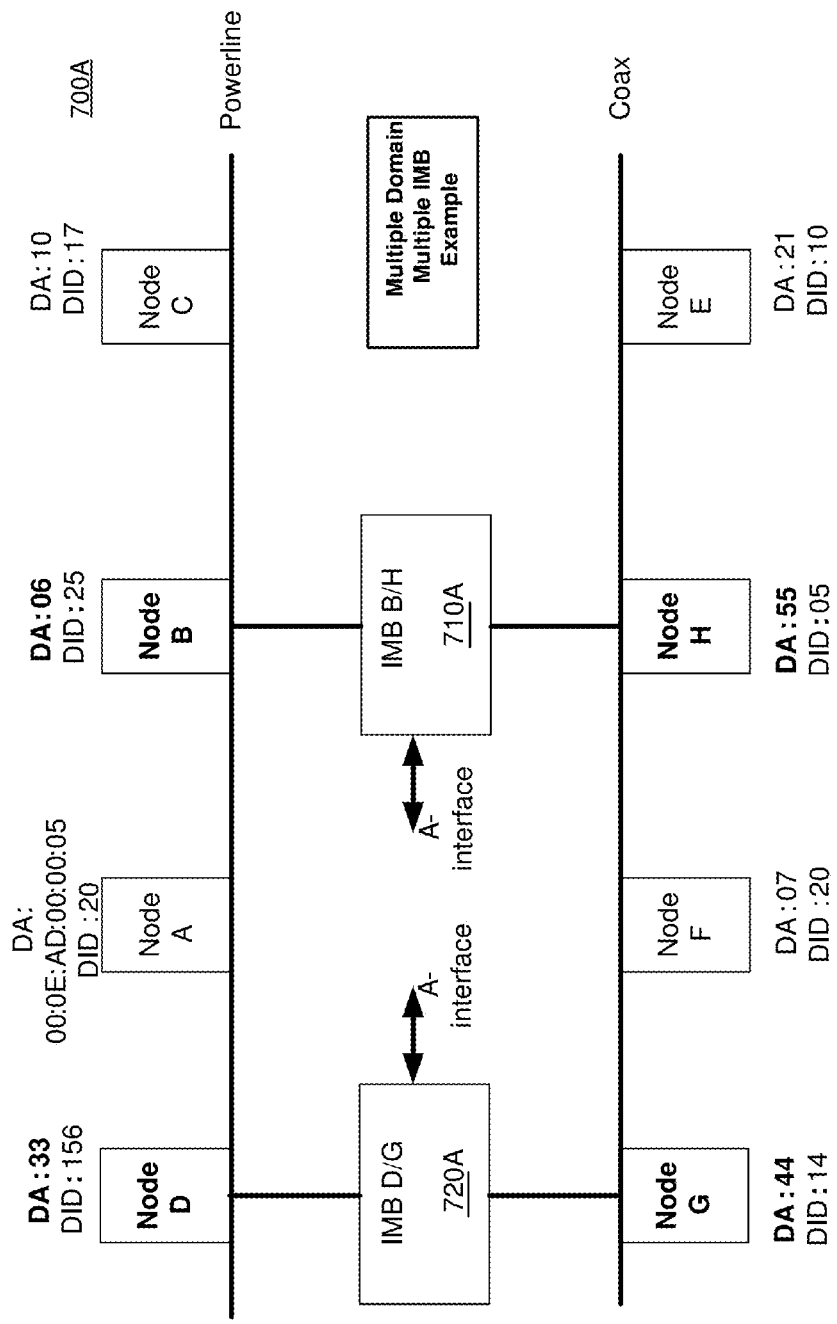
FIG. 7A is a diagram showing inter-medium bridging with multiple inter-medium bridges in accordance with still another embodiment of the present disclosure.

FIG. 7A illustrates a network environment 700A of inter-medium bridging with multiple inter-medium bridges in accordance with still another embodiment of the present disclosure.

The techniques as described above for supporting unicast, multicast and broadcast routing for the example network as shown in FIG. 7 are also applicable to an example network as shown in FIG. 7A, with the difference being association of two DAs to IMBs (one for each medium) instead of one DA as in FIG. 7.

Note that the techniques described are also applicable to the case in which IMB embodiments as shown in FIG. 6 (single-domain IMB using same DA for both nodes) and IMB embodiments as shown in FIG. 6A (single-domain IMB using different DA for each node) are part of the same network. Likewise, the techniques described are also applicable to the case in which IMB embodiments as shown in FIG. 7 (multiple domain IMB using same DA for both nodes) and IMB embodiments as shown in FIG. 7A (multiple domain IMB using different DA for each node) are part of the same network.

Example Embodiments of Cross-Domain Routing Updates

The G.hn standard defines the AAT as a table of Ethernet addresses and their association with the DIDs within the G.hn domain. The table includes a local part which associates Ethernet addresses with the local node (connected to A-interface), and a remote part which associates Ethernet addresses with other nodes in the domain. The remote part of the table is populated by collecting the local AAT entries that are advertised by other nodes. Details of the AAT are implementation-specific and not specified in the standard. However, since the goal is generally to quickly search for an Ethernet address and find its associated DID, the AAT would normally be implemented as some sort of content addressable memory.

Figure 8:
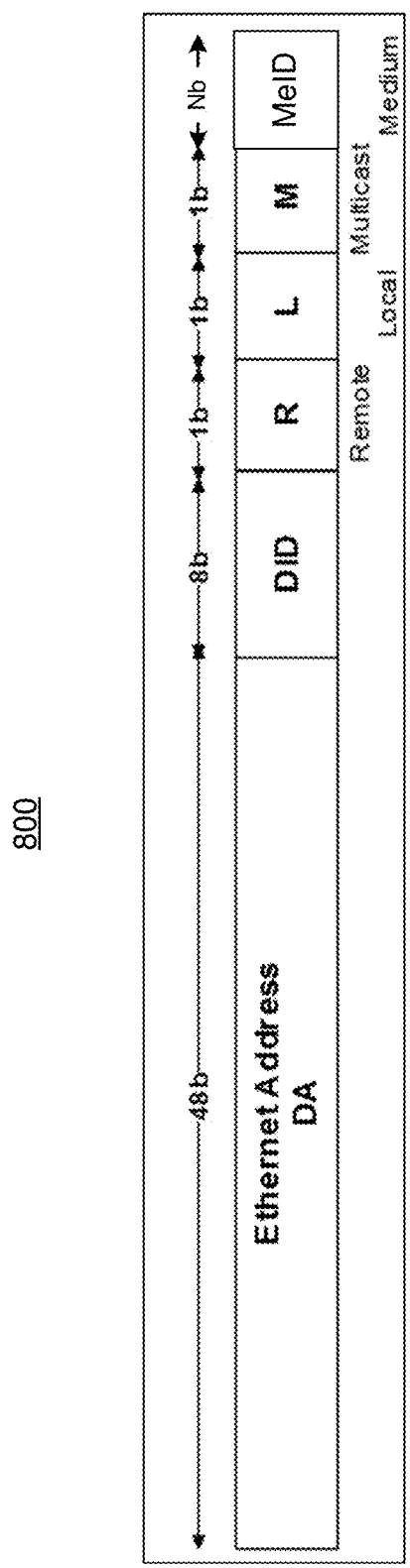
FIG. 8 shows an address association table entry in accordance with an embodiment of the present disclosure.

FIG. 8 illustrates an address association table 800 in accordance with an embodiment of the present disclosure.

The example implementation shown in FIG. 8 supports both unicast and multicast Ethernet addresses. An Ethernet DA is stored in each AAT entry and may be the key used to search the table. When the DA is found the rest of the table entry may be used to determine where the DA is located. The L bit in the AAT 800 indicates it is above the A-interface, and the R bit indicates that it is located in another node of the G.hn domain. When the R bit is set, the DID is the DID of the node that is attached to or otherwise associated with that particular DA. If the M bit is set, then the DA is associated with a G.hn multicast stream and the DID field is interpreted as the multicast identification (MID). Note that an MID may be associated with both local and remote destinations so the R, L, and M bits are not mutually exclusive. The term "IMB" used hereinafter refers to any suitable inter-medium bridging device such as the IMB devices described above.

To extend the AAT entry to support IMB functions an MeID field is added as shown in the AAT 800 of FIG. 8. In one embodiment the MeID field has one bit per connected medium that indicates whether the DA resides on that medium. That allows multicast addresses to be mapped to multiple mediums. The AAT 800 as shown in FIG. 8 has N bits to support N mediums, where N is a positive integer equal to or greater than 1. For unicast addresses, usually only one of the MeID bits is active for an address. None of the MeID bits are active when the unicast address is local to the A-interface (L bit). The DID that is stored with a unicast address is associated with the domain of the medium indicated in the MeID. In the case of a single-domain IMB, this DID may be unique across all the mediums connected to the IMB. In the case of a multiple-domain IMB, the same DID may be used on more than one medium. The AAT may be searched in order to determine routing and destination medium when a packet is received from the IMB's A-interface or when the IMB receives a packet from any G.hn medium that is addressed to the IMB's node ID in the LLC Frame Header. In the latter case the packet may need to be relayed to another medium.

In one embodiment, when a multiple-domain IMB receives a unicast packet from one medium and the MeID indicates it is destined for another medium, the IMB may temporarily store the packet until the other medium is available for transmission. Besides forwarding the packet to the other medium, the IMB may update the G.hn packet addressing because the packet will be routed to a different domain. This update is not necessary with a single-domain IMB. In one embodiment, the addressing update is made to the two one-byte fields of the G.hn defined LLC Frame Header (LFH) as shown in Table 1 below. These fields are updated since they are applicable and valid within a given domain.

TABLE 1

One-Byte Fields of the G.hn Defined LLC Frame Header

| Field Name | Octet | Bits | Description |
| --- | --- | --- | --- |
| OriginatingNode | 3 | [7:0] | DEVICE_ID of the node that created the LLC frame |
| DestinationNode | 4 | [7:0] | Destination identifier that indicates the node(s) to which the LLC frame is finally destined (§8.1.3.1.1.10) |

The IMB may modify the OriginatingNode field to have the node ID of the IMB in the target domain. The IMB may also modify the DestinationNode field to have the node ID of the node that is associated with the Ethernet address in the target domain. That ID is taken from the AAT entry DID field directly. Note that if the packet is encrypted the IMB may need to decrypt it using the key(s) for the source domain and re-encrypt it using the key(s) for the target domain. This process may incur additional delay and processing but can be avoided when both mediums operate as one domain. This process can also be avoided if the multiple domains share the security controller and/or use a unified security scheme similar to the approach taken in IEEE P1905.1.

If the AAT search results in a match with the multicast bit set then the packet may need to be routed to multiple places.

The packet may need to be routed to each medium for which the MeID bit is set and may also need to be routed to the A-interface (L bit) or relayed on the same medium (R bit). To support all possible routing cases for multicast packets, the IMB stores additional routing information in a separate table. The DID associated with the multicast entry in the AAT can be used to index into this table to look up the routing information for that multicast packet. Since the multicast packet may need to be sent to multiple mediums, the IMB may need to replicate the packet in order to change the encryption and LFH routing information for each target medium. It may also need to be decrypted to be sent to the A-interface.

When a packet received from the A-interface is a broadcast packet (e.g., with DA=FF:FF:FF:FF:FF:FF) then the IMB may need to forward the packet to all mediums. If the IMB is operating in multiple domains, it may need to set the OriginatingNode in the LFH to its node ID for each medium. Therefore, the IMB may replicate the packet for each medium, modify the LFH, encrypt it if encryption is enabled, and send the packet when the medium is available. Note that the IMB may also broadcast packets with an unknown DA (not in AAT) in the same manner. This will facilitate locating the DA if it exists somewhere in the G.hn network.

When the IMB receives a broadcast packet from one medium it may need to relay the packet to the other medium(s). In the case of a single-domain IMB, the decision to relay the packet to the other medium(s) is based on the BRT for the domain. No LFH addressing update is necessary when forwarding since all nodes are covered by the BRT. In the case of a multiple domain IMB the decision to relay the broadcast packet is determined by the loop avoidance algorithm. The algorithm could enable broadcast forwarding for each source and destination domain independently. Thus, in the common case of two-medium bridging, the IMB may need to forward in one direction but not the other. If the packet needs to be forwarded, the IMB may need to change the LFH OriginatingNode to its own device ID for that domain. It may also need to decrypt the packet using one domain's broadcast key and re-encrypt the packet using the other domain's broadcast key.

Example Embodiments of Multi-Medium Domain Coordination

As more than one medium is involved, multi-medium domain coordination is required. With respect to multi-medium domain coordination, when an IDB/IMB is first connected to two or more mediums, those mediums belong to different domains since they were not previously communicating with each other. Generally, the duration and start time of each domain's MAC cycle is not known to the other domain(s). With completely asynchronous MAC cycles it tends to be difficult for the IMB to coordinate transmissions with the different two or more domains. This is especially true when an IMB with only one PHY/MAC is used as this type of IMB cannot communicate with both mediums at the same time. For example, it would be possible for the Multiple Access Protocol (MAP) transmissions to overlap in the two or more domains. A single PHY/MAC IMB in this situation would not be able to decode the two or more MAPs during every MAC cycle. The IMB would also have difficulty requesting silent time (sleep) from one domain so that it can communicate with another domain since the MAC cycles can overlap in any way and the relationship between them is likely to change over time. These issues can be avoided if the two or more domain masters (DMs) align their MAC cycles. Aligned MAC cycles can also make inter-domain relaying more efficient and therefore potentially reduce packet latency and reduce latency jitter. This can be particularly important for maintaining quality of service (QOS) in inter-domain traffic.

The G.9961 neighbor domain procedures provide a mechanism for aligning MAC cycles and coordinating inter-domain transmissions. However, these procedures only apply to multiple power line domains. More specifically, the procedures rely on using the AC line as a timing reference and having MAC cycles that are the same duration. With these constraints, in a two-domain situation, the alignment only requires an offset to shift one of the MAC cycles appropriately. When the coordinating domains are on different mediums, however, a timing reference and a MAC cycle duration need to be first established in order to be used for the two or more domains. Afterwards, the MAC cycles can be aligned and transmissions can be coordinated if necessary.

An IMB can provide a timing reference to each domain to use for domain coordination. Since the IMB is registered in both domains it will track the network timing reference (NTR) for both domains between which the IMB bridges. Therefore, the IMB may provide an offset to each DM that indicates the difference between the NTRs. Then, each DM may apply this offset when communicating with the other DM.

When an IDB is used instead of an IMB it may not be possible for the IDB to know the NTRs for both domains. This would be the case when the IDB was implemented by bridging two G.hn transceivers using an Ethernet switch. In that case the transceivers would need another method to establish a timing reference. Once the timing reference is established, the MAC cycles may be defined based on a starting NTR value and a given duration. The IMB/IDB may provide the timing reference, MAC cycle start and MAC cycle duration to each domain master using one message per domain.

Once each DM knows the MAC cycle of the other domain it needs to make a decision if it should adopt the other domain's MAC cycle. In one embodiment, an algorithm for determining whether or not another domain's MAC cycle is to be adopted may include a number of steps as follows:

1) If only one domain is on power line, the other domain(s) would align to domain that is on power line. This will ensure that the power line domain can still track the AC cycle for efficient use of the medium.
2) If multiple domains are on power line, then use the "neighbor domain" procedure as defined in G.9961 to align the domains and then align non-power line domains to the chosen power line domain's MAC cycle.
3) If none of the domains is on power line, then choose the MAC cycle with the longest duration.
4) If durations are already equal, then align to the MAC cycle of the domain which has the domain master with the lowest bit reversed MAC address.

Once the domains are aligned it would be possible to use the neighbor domain messaging procedure to coordinate transmissions for the interfering nodes (i.e., the IMBs). In one embodiment, the IMB may coordinate scheduling by requesting inactivity from each DM. In some embodiments, the MAC cycle alignment may also be a first step to merging the two domains into one. If the domains were merged it would be easier to produce optimal routing and support end-to-end encryption and QOS. Recent updates to G.9961 define a method for merging two domains. This method may be used directly once the MAC cycles are aligned.

Inter-Domain Routing

Figure 9:
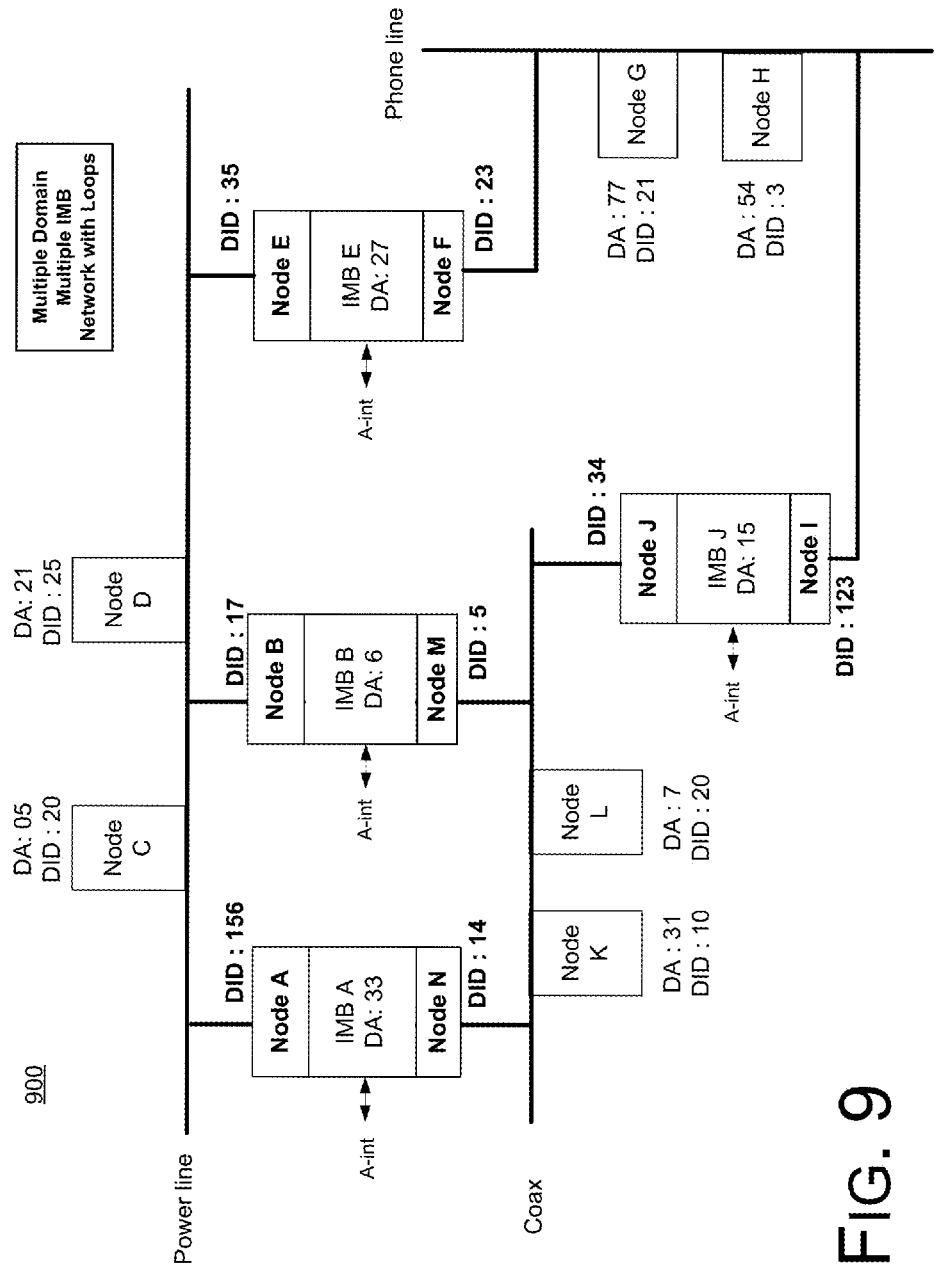
FIG. 9 is a diagram showing inter-medium bridging in a home networking environment with multiple routing loops in accordance with an embodiment of the present disclosure.

FIG. 9 illustrates inter-medium bridging in an example G.hn home networking environment 900 with multiple routing loops.

In the example shown in FIG. 9, a routing loop may be formed by IMB A and IMB B in parallel or by the path through all mediums using IMB E, IMB J, and IMB A or B. Generally, the loops form during broadcasts if the IMBs forward broadcasts they receive from one medium to the other. Since proper network operation requires broadcasts to reach all nodes, a solution is needed to allow some forwarding without forming routing loops.

In the above example, each IMB may register with the two domains to which it is connected. Each IMB may receive a different DID from each domain but may have only one MAC address. In each domain, each IMB reports its routing connectivity and AAT to the domain master. Each IMB's local AAT may contain the MAC addresses above its A-interface and its remote AAT may contain the MAC addresses accessible by its G.hn connection in that domain. In one embodiment, for an IMB to provide routing to another domain within the G.hn DLL layer, the IMB may include MAC addresses it can reach in the other domain in its local AAT reported to the DM. For example, node A of IMB A may include local AAT entries for nodes K and L while node N of IMB A may include local AAT entries for nodes C and D. Since IMB B is in parallel with IMB A, IMB B may report the same routes to the domain master. This parallel path is not generally a problem for unicast routing since it is expected that the domain master or nodes will choose a path and only route through one IMB for each destination node in the other domain. If the decision is made by the domain master, the domain master may take into account the speed or average loading of each link. However, the domain master may not be able to resolve the bigger loop formed by three IMBs (i.e., IMB A, IMB B and IMB E) across all mediums in FIG. 9. Also, if each IMB forwards broadcast messages between domains the messages may likely get replicated by IMB A and IMB B and continuously circulate between IMB A and IMB B, and also around the three-IMB loop. The above-described routing loop problems may be resolved by disabling the routes between domains for some of the IMBs. There may exist internet routing algorithms that do this effectively at the IP layer (OSFP, BGP, Babel). These algorithms may be appropriate for eliminating routing loops in a network built with IDBs instead of IMBs. However, a simpler approach may be taken in accordance with the present disclosure since the G.hn DLL routing information is available. Generally, the loops need to first be detected and then they can be avoided or eliminated by limiting the routes that each IMB reports to the domain master. Coordination is required between IMBs to do this in an efficient manner. Embodiments of example approaches for inter-domain routing will now be described below.

In some cases (see IMB A and IMB E in FIG. 9A) the nodes associated with the IMB may have different MAC addresses. In each domain, each IMB's node reports its routing connectivity and AAT to the domain master. Each IMB's node's local AAT may contain the MAC addresses above its A-interface and its remote AAT may contain the MAC addresses accessible by its G.hn connection in that domain. The techniques described above for example embodiment in FIG. 9 are applicable in those cases as well.

Example Embodiments of Implicit Loop Prevention

When IMBs report every MAC address that is visible by bridging the two domains, then loops may be easily detected. In the example shown in FIG. 9, IMB A is registered as node A in the power line domain and as node N in the coax domain; IMB B is registered as node B in the power line domain and as node M in the coax domain; IMB E is registered as node E in the power line domain and as node F in the phone line domain; and IMB J is registered as node J in the coax domain and as node I in the phone line domain. Node A may advertise to the power line domain that nodes J, K, L, M and N are in its local AAT and nodes B, C, D and E are in its remote AAT. After IMB J detects the connected MAC addresses in the phone line domain, a topology update may be sent to node N that shows that nodes F, G, H and I are in the local AAT for node J. These nodes may also be added to the local AAT for node A. When IMB E is traversed nodes A, B, C, D and E may also be added to node A's local AAT. Since these MAC addresses also exist in its remote AAT, node A can detect the loop. The loop formed by IMB A and IMB B is more simply detected since nodes A and B are directly connected and each will see the same coax domain nodes advertised from the other.

In one embodiment, loops that are detected implicitly can be prevented using a simple rule as follows: An IMB does not enable cross-domain broadcast routing or report the unicast routes in its local AAT if those routes will form a loop. As long as each IMB can be sure that another IMB is not adding new cross-domain routes at the same time, loops will not occur. The timing of routing updates can be staggered within each domain to prevent this race condition. However, if four or more domains were included in one routing loop it may still be possible for a loop to form by turning on routes on two of the non-adjacent neighboring domains at the same time. This type of topology can be explicitly avoided while configuring a home network without losing any significant functionality or connectivity.

Example Embodiments of IMB Topology Updates

An IMB that detects a loop may still provide all topology updates to the domain master as required for scheduled updates and for event driven updates. However, the updates may not include the MAC addresses that, if included, would cause routing loops. Also, the IMB may not enable forwarding of broadcast messages across domains if it determines that a routing loop would form. Each IMB enables broadcast forwarding if and only if it concludes that a routing loop would not be formed. With this approach, the domains may be fully connected for broadcast messages without forming a routing loop. In some cases multiple IMBs may enable broadcast forwarding and form a routing loop if care is not taken to avoid that. Details of a proposed technique to prevent that from happening are provided below.

Each IMB examines the routing information conveyed by the DM via the domain routing messages to look for routing loops formed when combined with its own routes. Specifically, the IMB examines the AAT entries of other nodes for entries that are also in its local AAT. If a MAC address is already listed in the local AAT entry of another node, then the IMB removes that entry from its local AAT copy that will be sent to the DM. If no duplicates exist then it sends a topology update to the DM that includes all of its local AAT entries.

Each IMB waits for the updated routing messages to be received from the DM. If all of its routes are included and no other node added loop forming routes, then the IMB may enable broadcast forwarding. Note that if the DM filters any MAC address because it is a duplicate and already indicated as a local MAC address by another node, the IMB may not see some routes it advertised and therefore may not enable broadcast forwarding.

If two nodes advertised the same MAC addresses from a different domain as local MAC addresses at the same time and the DM does not filter them, then those two nodes may both see the loop and not enable broadcast. Each node may then set a random timer and send a topology update to the DM when the timer expires that removes these MAC addresses if it does not receive a new routing table from the DM with the other nodes' duplicate MAC addresses removed before the timer expires.

Upon confirmation from the routing table sent by the DM that an IMB has the only route to all conflicting MAC addresses, the IMB may enable broadcast forwarding.

If an IMB discovers that the DM assigned some conflicting MAC addresses to it and some to other IMBs, it may only enable broadcast forwarding if the bit reversed MAC address of one of its nodes is the lowest among the conflicting IMBs.

If an IDB that does not support this protocol is connected to the network, the compatible IMBs may not enable broadcast forwarding if a loop appears with that IDB. Therefore, assuming the non-compatible IDB always enables broadcast forwarding, no routing loops will form and the network will have complete broadcast connectivity. This method also supports multiple non-compatible IDBs connected to the network as long as those IDBs do not form a loop by themselves which can be ensured during network configuration. For example, if IDBs were inserted into the network of FIG. 9 in place of IMB E and IMB J, then IMB A and IMB B could still prevent loops by following this method.

Although the above-described implicit loop detection method avoids routing loops, it could result in an inefficient network. For example, if IMB E and IMB J added routes between nodes C and K before IMB A and IMB B, then using the implicit loop detection method described above, IMB A and IMB B would both disable routes between nodes C and K that pass through them to avoid the loop. Therefore, a message from node C to node K would have to traverse all three domains via IMB E and IMB J. This causes traffic on the phone line domain that may be inefficient and unnecessary considering that the coax and power line domains are connected directly by IMB A and IMB B. In one embodiment, this situation can be improved if IMB A and/or IMB B are allowed to advertise cross-domain unicast routes between nodes C and K that are different from the cross-domain unicast routes between those nodes advertised by IMB E and IMB J and only disable broadcast forwarding to prevent forming a loop. Then the path from node C to node K could be chosen by node C if allowed or by the domain master. Node C may not know which route is closer but the domain master could use link bit rate or other metrics to decide. In this embodiment the unicast routing is generally more efficient but the broadcast routing would still follow the first path that happened to be discovered without forming a loop.

Example Embodiments of Explicit Loop Prevention

The technique described in the previous section allows IMB A and IMB B to implicitly detect each other's presence without direct communication. This technique works well for parallel IMBs. However, it is more difficult for IMB A and IMB B to infer the presence of IMB E and IMB J implicitly. They can detect the loop, but the structure is not easily determined because the topology messages from IMBs to the DMs do not distinguish between MAC addresses that are above the A-interface and those that are in another domain. Therefore, the full topology is not known and best loop free routes cannot be determined by each IMB.

One solution is for IMBs to exchange information when it is detected that more than one IMB exists in the same domain.

In order to start communicating, IMBs need to be aware of each other's presence. This can be accomplished using a predefined indication, such as a Hello indication for example, that each node of an IMB broadcasts on its medium periodically and when it first joins the domain. If another IMB exists on the same medium it may respond to a Hello indication with a predefined response message, such as a Hello response message for example. Each of these messages carries the device ID and MAC address of the IMB that sent it.

In some cases (see IMB A and IMB E in FIG. 9A) the nodes associated with the IMB may have different MAC addresses.

The scope of these broadcast messages should be limited to the current domain. The predefined responses could be sent via unicast to the node that sent the indication. However, using broadcast will allow all IMBs to find each other using one message exchange (multiple responses to one indication).

Once the IMBs in the same domain are known, they can exchange connectivity information to allow each to make better routing decisions. Each node in the domain already knows routing information that is distributed by the domain master. For efficiency, the IMBs do not need to repeat this information. However, some exchange of connectivity metrics may be necessary. A simple approach could be taken for a home network similar to that of FIG. 9. Each IMB could notify the other IMBs in the same domain, a list of MAC addresses that are connected to its A-interface and a list of MAC addresses in other domains that can be directly reached via the IMB (i.e., without going through additional inter-domain IMBs). This may allow each IMB to infer the network connectivity that is within two IMB hops. The notification may be accomplished by sending the lists of MAC addresses to the other IMBs in the same domain using predefined message, such as an IMB topology message for example. This message may be sent unicast to each IMB or broadcast to all, depending on which method is more efficient for that domain. Note that this method only allows the IMBs to infer the number of IMB hops to each MAC address. It would be possible to use more accurate link metrics for routing decisions if per-hop costs (e.g., link rate) were also communicated between IMBs. Once the updated IMB topology is known by all the IMBs in the network, the IMBs analyze all their cross-domain routes to determine which of the routes need to be removed and which need to be added to the routing tables of specific domains with the goal of minimizing the number of IMB hops in each of the routes. This determination is consistent across IMBs connected to the same domain because they all have the same information. The IMB responsible for removing the route has to confirm that the alternate route going through fewer IMB hops is either already present or is added, before removing the route.

The following example illustrates how the algorithm would work on the sample network FIG. 9. For this example, IMB A and IMB B are not initially in the network and the scenario after IMB A is connected to the network is considered. After IMB A is added to the network the optimal route in terms of number of IMB hops between the nodes may change. The routing tables need to be updated accordingly. The following steps explain how this happens.

1) The existing network topology is known and the routing information is distributed by all domain masters. For example, node E has notified the domain master for the power line domain that nodes G, H, I, K and L, are in its local AAT. Likewise, node F has notified the domain master for the phone line domain that nodes C and D are in its local AAT. Node C has a route to Node K via IMB E and IMB J.
2) IMB A joins the network and registers with the power line domain as Node A and coax domain as Node N.
3) IMB A learns the topology of its domains and reports routes to the MAC addresses above its A-interface and may report routes to the MAC addresses that it can see across other domains to its domain masters. For example, Node A may advertise routes to MAC addresses associated with nodes G, H, I, K, and L to the domain master for the power line domain and node N may advertise routes to MAC addresses associated with nodes C, D, E, G, H and I to the domain master for the coax domain.
4) IMB A does not turn on broadcast forwarding because it knows that a routing loop would be formed.
5) Node A and node N send Hello indications on their respective mediums.
6) Node E responds to node A and node J responds to node N with a Hello response.
7) Nodes A and E, and also nodes N and J, exchange IMB topology messages. In this example in FIG. 9, for simplicity of description no devices are shown above the A-interface, therefore no MAC addresses are indicated as being attached to the A-interface of the IMBs in the IMB topology messages.
8) In the IMB topology message sent to Node E, Node A indicates that MAC addresses 31, 7, and 15 are directly addressable in the coax domain. Any MAC addresses that were connected to the A-interface of nodes K, L, and J are also included in that list. Likewise, in the IMB topology message sent to node A, node E indicates that MAC addresses 15, 77, 54 and any MAC addresses connected to the A-interface of nodes I, G, and H are directly addressable in the phone line domain.
9) In the IMB topology message sent to Node J, node N indicates that MAC addresses 5, 21, 27 and any MAC addresses connected to the A-interface of nodes C, D, and E are directly addressable in the power line domain. Likewise, in the IMB topology message sent to Node N, node J indicates that MAC addresses 27, 77, 54 and any MAC addresses connected to the A-interface of nodes F, G, and H are directly addressable in the phone line domain. The IMB network topology is now known by all IMB nodes in the network. For example, IMB A knows that nodes C, D, K and L are directly connected and nodes E and J are IMBs. Also, IMB A knows that nodes G and H are two IMB hops from nodes in the power line domain (e.g. nodes C and D) if bridged through IMB A via the coax domain, but they are directly connected to IMB E. Similarly, IMB A knows that nodes G and H are two hops away from nodes in the coax domain (e.g. nodes K and L) if bridged through IMB A via the power line domain, but they are directly connected to IMB J. Similarly, IMB E knows that nodes C, D, G and H are directly connected and nodes A and J are IMBs. Also, IMB E knows that nodes K and L are two IMB hops from nodes in the power line domain (e.g. nodes C and D) if bridged through IMB E via the phone line domain.
10) All routes that are two or more IMB hops away can be inferred by all the IMBs in the network, as described for IMB A above. All the IMBs in the network analyze their cross-domain routes to determine which of the routes need to be removed and which need to be added to the routing tables of specific domains with the goal of minimizing the number of IMB hops in each of the routes.
11) IMB E determines that the route from the power line domain to coax is two hops through it but less than two hops through IMB A. Based on this, node E sends a topology update to the domain master of the power line domain to remove its route to nodes K and L. Based on similar analysis, node A sends topology update to the domain master of the power line domain to add its route to nodes K and L. After receiving these topology updates from nodes A and E, the power line domain master distributes a routing update that routes C and D to nodes K and L through IMB A.

The above example shows how a network using this strategy will converge to an efficient unicast routing network without requiring direct IMB interaction from the domain masters or non-IMB nodes. This ensures that IMBs can be inserted into existing networks and maintain compatibility with regular G.hn devices. The resulting network will also have full broadcast connectivity if each IMB sends the broadcast packets it receives on its A-interface to all mediums for which broadcast forwarding is enabled at that IMB and forwards broadcasts across mediums for which broadcast forwarding is enabled. When domain routing updates occur each IMB may re-evaluate the potential loops to see if it should turn on or off broadcast forwarding or modify unicast routes. This process may be made simpler by the additional information that is explicitly shared between IMBs.

The method described above relies on using the implicit loop prevention method described previously and adding communication between IMBs to improve efficiency of the resulting network. Alternatively or additionally, once the IMBs are communicating with each other they can exchange more information in order to prevent loops rather than relying on implicit detection. In that case, the IMBs will still establish communication using the Hello message method. Then, in order to facilitate each node making routing decisions a more detailed message, such as an IMB topology message for example, will be exchanged. This message will comprise of the following information:
1) Type of IDB/IMB: single-PHY IMB, multi-PHY IMB, Switching IDB, or G.hn routing IDB;
2) Domain ID of the connected domain(s);
3) A metric per domain that defines the cost for routing to that domain through this IMB (e.g., average data rate, G.hn input to target domain G.hn output); and
4) The list of MAC addresses that belong to each domain along with a metric per MAC address that defines the cost for routing to that MAC address. If a MAC address will be reached by traversing a second IMB then the metric for that MAC address will include the sum of the cost to route to the second IMB and the metric reported by the second IMB for that MAC address.

In some cases (see IMB A and IMB E in FIG. 9A) the nodes associated with the IMB may have different MAC addresses. This information may also be added to the IMB topology message in those cases.

With this information collected from each IMB in the domain, the IMBs can determine any loops that exist. For example, if two IMBs in a first domain notify each other that they are connected to the same second domain and at least one matching MAC address in that domain, then they can determine that they are connected in parallel between the first and second domains. Also, if the two IMBs in the first domain notify each other that the same MAC address is attached to different domains on a second interface, then they can determine that a loop exists involving at least one additional IMB or IDB bridge. When a loop is detected, the IMBs can use the per-MAC metric information to decide the best route for each MAC address. Besides the unicast routes, the IMBs can also use the per-domain metrics to decide which IMB to use for forwarding broadcast messages to each connected domain. The IMBs will only report cross domain routes to the DM and enable broadcast forwarding after completing this procedure. Therefore, the explicit loop avoidance method has lower probability of transient loops forming than the implicit method.

The IMBs will perform the procedures described above independently for each domain in which they are connected. Therefore the unicast routing and broadcast forwarding decisions will be made for each domain separately and the results could be different. For example, if multiple IMBs exist in the network then an IMB connected to a first domain and a second domain could enable broadcast forwarding from the first domain to the second, but not from the second domain to the first.

Example Embodiments of Centralized Loop Prevention

The previous sections describe techniques of solving the routing loop problem using a distributed approach that only requires participation from IMBs. Alternatively, a centralized approach where the DMs decide the unicast and broadcast routing for the entire multi-domain network is also proposed herein. The G.hn standard describes the Global domain master (GM), a node responsible for coordinating between the domains in a network that are connected by IDBs (or IMBs). The GM may be a node that is configured as a GM or it may be selected from among the connected DMs. Once a GM is selected, all DMs will send it the topology and routing information that the GM can use to determine routing for the entire network. The GM may use a routing algorithm such as Dijkstras algorithm to produce a loop-free spanning tree to use for routing between domains. The GM may decide which IMBs to use for unicast and broadcast routing and communicate this information to the DMs.

In order for the DMs to communicate with each other and the GM, the DMs need to discover the network outside of their domains. When an IMB/IDB sends topology information to its DM it will include an indication that it is connected to another domain through an IDB indication. This indication is supported by the current version of the G.hn standard. Once the DM has identified which nodes are IMB/IDBs it can request additional information from them. The DM may send a message, such as an IDB_Topology-Change.req message for example, to ask the IDB, used as both IMB and IDB, to provide its cross-domain topology information. The IDB may respond with a message, such as an IDB_TopologyChange.cnf message for example, which provides the additional IDB specific information. At a minimum this message may include a number of pieces of information as follows:

1) Type of IDB/IMB: single-PHY IMB, multi-PHY IMB, Switching IDB, or G.hn routing IDB;
2) Domain ID of the connected domain(s);
3) MAC address of the connected DM;
4) A metric that defines the cost for routing to each domain of this IMB (e.g., average data rate, G.hn input to target domain G.hn output);
5) A list of MAC addresses for the IMB that resides above the A-interface rather than in a connected G.hn domain; and
6) If more than one connected domain, the list of MAC addresses that belong to each domain. This is not necessary with only one connected domain since it can be inferred from existing routing information.

In some cases (see IMB A and IMB E in FIG. 9A) the nodes associated with the IMB may have different MAC addresses. This information may also be added to the IDB_TopologyChange.cnf message in those cases.

This information may be sent to the DM for each domain and repeated periodically or when an event causes a topology change. Once the DMs have this information they can exchange topology information with the connected DMs. The DMs may also forward topology information received from one IMB to other visible DMs as long as the domains are not connected and the message has not already been forwarded to that DM (sequence number check). In this manner every DM will learn the topology of all other connected domains. In order to select or discover a GM it is not necessary to send the full topology information. The messages may only include items 1-3 in the list above with the rest being sent only to each connected DM and to the GM. With the inter-domain topology known, each DM can communicate with the others to identify or select a GM. The rules for selecting a GM may follow similar guidelines as those for selecting a DM within each domain.

To minimize the loading on the GM and provide a more fault-tolerant network, in some embodiments the DMs may still be responsible for routing decisions within their domains. In these embodiments, each DM would calculate and distribute the unicast and broadcast routing (BRT) routing information to all nodes within the domain. The GM may only be responsible for determining inter-domain routing. Depending on the capabilities of the GM, one of two approaches may be taken. In a simplified routing approach, the GM may calculate a simplified routing that only considers the IMB cost metrics when determining the shortest routes for unicast and broadcast traffic. In a detailed routing approach, the GM may calculate more detailed routing costs for each path through IMBs based on the link metrics and internal routes reported from the DM for that domain. Detailed description of the two approaches is provided below with reference to FIG. 9.

In the simplified routing approach, the GM needs to connect the power line domain to the phone line domain to provide a route from nodes C and D to nodes G and H. The GM runs a shortest path algorithm to find good paths using only the IMB metrics as the weights. The cost of routing through IMB E is just the cost for IMB E while the cost of routing through IMB A is the sum of the costs of routing through IMB A and IMB J. The GM may make the decision to take the lowest-cost path for unicast transmissions. Since only IMB metrics are considered, all power line nodes will route to the phone line domain using the same path. Global broadcast routing is calculated in a similar manner but with loop avoidance considered. The GM may enable broadcast forwarding for certain IMBs in order to produce a fully connected broadcast tree without loops. In all cases the GM calculates the cross-domain portion of the routes.

A difference between the simplified routing approach and the detailed routing approach is that, in the detailed routing approach, the route between a first node in a first domain and a first node in a second domain may go through one set of IMBs while the route from a second node in the first domain to a second node in the second domain may go through a different set of IMBs. This is due to the total path costs being considered in the routing decision in the detailed routing approach. In the detailed routing approach, the GM may use all available information to calculate the routes. For example, to determine a route from node C to node G, the GM may consider the cost of transfer from node C to node E, plus the IMB E cost, plus the cost from node F to node G. In this way the GM may determine an optimum route for each cross-domain unicast connection. Note that the GM does not modify any intra-domain routes, and only modifies the routes to MAC addresses that exist in another domain and therefore cross an IMB. Also, it is possible for a route between inter-domain nodes to take a different path in each direction since the cost metrics can be different for each direction. For broadcast forwarding, the GM may calculate a BRT for domain crossing broadcasts, similar to the way each DM calculates an intra-domain BRT. With this approach, broadcasts from each node may take a different path by being forwarded by different IMBs. Note that within each domain the broadcast packets may follow the normal BRT path and therefore reach every node in the domain. The GM-generated BRT defines which IMB nodes perform forwarding based on the node that originated the transmission.

Once the GM has generated the inter-domain routing it needs to be communicated to the DMs. Since each of the DMs control the routing within its own domain, the GM may indicate which IMB should be used to route to each inter-domain MAC address for unicast messages. The GM may send each DM a routing message that lists the MAC addresses to associate with each IMB node. To reduce network traffic, the GM routing message may include an indication that all MAC addresses should use a particular IMB. This is likely to be a common case especially when simplified inter-domain routing is used. Besides the unicast routes the GM may also communicate the broadcast routes to the DMs.

In the simplified routing approach, the broadcast forwarding may be enabled or disabled for each direction of each IMB. In the detailed routing approach, the broadcast forwarding may also depend on the source node of the broadcast message. To support both approaches the message content may include the following pieces of information: <IMB MAC Address>, <Source Domain>, <Destination Domain>, <Enable/Disable Forwarding>, and <List of Source Nodes>. The list does not need to be included when the list includes all sources.

In some cases (see IMB A and IMB E in FIG. 9A) the nodes associated with the IMB may have different MAC addresses. The <IMB MAC Address> conveyed in those cases would be the one for the IMB node associated with the domain to which the message is sent.

In some embodiments it may be beneficial to allow the GM to modify routes that are internal to each domain as well. In this case, referred to as mesh routing approach, the GM may take over all routing tasks for the G.hn multi-domain network. The advantage of the mesh routing approach is that the GM can route unicast traffic using any path that results in the lowest-cost. For example, in the network shown in FIG. 9 the power line connection from node A to node B may have high attenuation and therefore require the nodes to use low speed standard BAT messaging or relay messages through other nodes. In that case it may be more efficient to allow node A to route to node B through the coax medium. Since each DM is only concerned with its own domain, only the GM can recognize and optimize these types of routes. However, in order for the GM to do that the GM needs to receive the complete routing information sent from every node, and each DM needs to accept routing tables sent from the GM. The additional capabilities may be worth the additional network traffic for networks that have paths through multiple mediums to reach some nodes (loop structures). The GM can decide which medium to use for each connection based on the latest topology information received from the DMs.

Similar to the implicit and explicit loop prevention approaches, the centralized approach is designed to be an extension of G.hn and does not require changes to existing G.hn compatible nodes that are not domain masters or IDB/IMBs. Existing DM function is also preserved. However, there is one case not discussed in the standard and needs to be clarified. For the centralized approach the DM may recognize when the same Ethernet MAC addresses appear above the A-interface of multiple nodes. This will allow the DM to recognize bridges that do not follow the protocol. In this case, the DM may prune the duplicate MAC addresses from the other bridge(s) and choose one route among the multiple possible routes in the routing update it sends. However, since the GM needs all topology information the topology messages sent to the GM may include information on all connectivity. After the GM calculates the best paths the DM may send updated routing information to the domain if necessary.

Multiple Mediums in the Same Domain

The preceding disclosure describes multiple methods of preventing routing loops in a multiple IMB network. The example network in FIG. 9 was discussed in the case where each physical medium is a separate G.hn domain. When multiple mediums exist in the same domain, the loop prevention mechanism can be simplified. In some embodiments, some mediums of a network may exist in the same domain, while others exist in different domains. For example, in FIG. 9 the power line and coax mediums could operate as part of one domain while the phone line medium operates as a separate domain. In that case the domain master for the power and coax domain would be responsible for making routing choices across IMB A and B as if they were normal relay nodes within the G.hn domain while IMB E and J would rely on the loop prevention methods discussed herein.

Figure 9A:
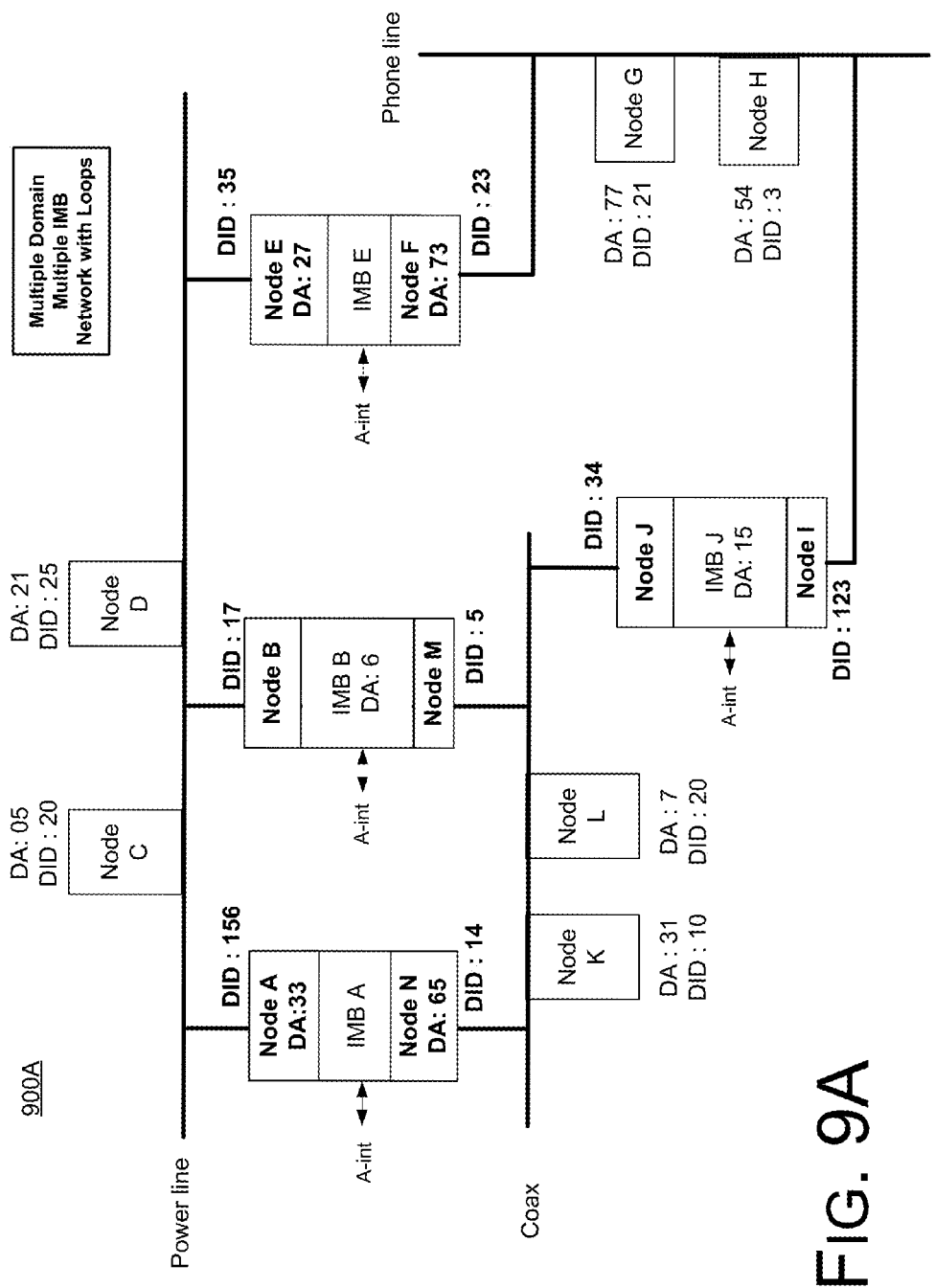
FIG. 9A is a diagram showing inter-medium bridging in a home networking environment with multiple routing loops in accordance with another embodiment of the present disclosure.

The loop avoidance techniques and network examples described in the present disclosure are independent of the type of IMB that is used. For example, in the example network shown in FIG. 9A, any of the IMBs could be implemented according to architecture 200 shown in FIG. 2 or architecture 300 shown in FIG. 3. Additionally, the methods apply for IMBs that use one Ethernet DA as shown in FIG. 4 and those that use two DAs as shown in FIG. 5A. The latter is illustrated in FIG. 9A since IMB A and IMB E use two DAs while IMB B and IMB J use one DA.

Example Processes

FIG. 10 illustrates a process 1000 of inter-medium bridging including inter-domain routing in accordance with an embodiment of the present disclosure.

Example process 1000 includes one or more operations, actions, or functions as illustrated by one or more of blocks 1002 and 1004. Although illustrated as discrete blocks, various blocks may be divided into additional blocks, combined into fewer blocks, or eliminated, depending on the desired implementation. Process 1000 may be implemented in one or more scenarios as depicted in one or more of FIGS. 2-9. Further, process 1000 may be implemented by software, firmware, hardware, or any combination thereof in an integrated-circuit processor, a chipset or a communication device. For illustrative purposes, the operations described below are performed by a processor or integrated circuit of a communication device, referred to as a first inter-medium bridging device in the embodiments described herein. Process 1000 may begin at block 1002.

At 1002, the first inter-medium bridging device may bridge communications between a plurality of mediums of a network connected to the first inter-medium bridging device at the DLL layer of the OSI model. The plurality of mediums may comprise at least a first medium and a second medium that may be the same as or different from one another, where the first medium and the second medium are separate communications channels.

At 1004, the first inter-medium bridging device may facilitate communications between an external device and the network through an application interface of the first inter-medium bridging device.

In at least some embodiments, each of the first medium and the second medium may be a coaxial line medium, a power line medium, a phone line medium, or a plastic optical fiber.

In at least some embodiments, the first medium and the second medium may be different frequency bands on a same physical medium.

In at least some embodiments, the first medium and the second medium may be different two wire combinations of a three-wire power line medium.

In at least some embodiments, the first medium and the second medium may be different physical mediums of a same type that are not electrically connected to one another.

In at least some embodiments, the first medium and the second medium may be the same physical medium such that a first communication channel on the first medium and a second communication channel on the second medium are at least partially isolated from one another by some amount of signal loss. For example, there may be two domains operating at the same power line wires. The domains may be separated by distance or by attenuating devices such as circuit breakers in the power line.

In at least some embodiments, the operation of bridging may comprise bridging at least two of the physical mediums in one G.hn domain.

In at least some embodiments, process 1000 may further comprise functioning, by the first inter-medium bridging device, as a respective G.hn domain master for at least one of the plurality of physical mediums.

In at least some embodiments, process 1000 may further comprise scheduling, by the first inter-medium bridging device, transmission of data between the plurality of physical mediums by one of the physical mediums at a time.

In at least some embodiments, process 1000 may further comprise communicating, by the first inter-medium bridging device, as a G.hn node on one of the physical mediums at a given time.

In at least some embodiments, the first inter-medium bridging device may be a multi-input multi-output (MIMO) inter-medium bridging device in accordance with the ITU-T G.hn standards. In at least some embodiments, the first inter-medium bridging device may be configured to simultaneously transmit and receive packets over two or more independent single-output single-input (SISO) physical interfaces, each interface connected to a different communication channel, when the two or more independent SISO physical interfaces are not configured for MIMO operation. For example, the transmission and receiving may occur independently on the two channels and do not need to occur at the same time. Further, each channel may be used for a different medium. The two MIMO channels may be re-used or re-configured for the purpose of creating the IMB with two independent channels.

In at least some embodiments, process 1000 may further comprise operating, by the first inter-medium bridging device, as a respective node on each of more than one of the physical mediums as one node per medium at a given time.

In at least some embodiments, process 1000 may further comprise operating, by the first inter-medium bridging device, as a G.hn Medium Access Plan (MAP) relay and a registration proxy such that domain masters are allowed to register nodes and propagate MAP scheduling information to one or more other mediums. Moreover, process 1000 may further comprise operating, by the first inter-medium bridging device, as a G.hn authentication proxy such that a security controller on the first medium is able to authenticate nodes on one or more other mediums connected to the first inter-medium bridging device.

In at least some embodiments, process 1000 may further comprise storing, in an address association table (AAT), an association of a destination identifier (DID) and an Ethernet destination address (DA) of a first node to one or more of the physical mediums to which the first node is attached. In at least some embodiments, an entry of the AAT maintained by a second node may include: a first field that stores the DA of the first node; a second field that stores the DID of the first node; a third field that indicates whether the DA of the first node is associated with another node of a G.hn domain to which the second node belongs; a fourth field that indicates whether the DA is above the application interface; a fifth field that indicates whether the DA is associated with a G.hn multicast stream and whether the DID is interpreted as a multicast identifier (MID); and a sixth field that indicates which one or more physical mediums the DA resides on.

In at least some embodiments, process 1000 may further comprise detecting, by the first inter-medium bridging device, a loop formed by a second inter-medium bridging device that is connected to two domains to which the first inter-medium bridging device is connected. Process 100 may also perform either or both of: disabling forwarding of broadcast packets between domains; and disabling reporting to a domain master of unicast routes in a local address association table (AAT) of the first inter-medium bridging device in response to the first inter-medium bridging device determining that a loop would be formed by including the unicast routes. In at least some embodiments, in detecting a loop, process 1000 may implicitly detect a loop by: examining, by the first inter-medium bridging device, AAT entries of other nodes for duplicate MAC addresses that are also in the local AAT of the first inter-medium bridging device; removing, by the first inter-medium bridging device, a duplicate MAC address in response to the duplicate MAC address being listed in the AAT of at least one of the other nodes and in the local AAT of the first inter-medium bridging device; and transmitting, by the first inter-medium bridging device, a topology update to a first domain master, the topology update including local AAT entries of the first inter-medium bridging device containing MAC addresses that do not also exist in AAT entries of other nodes. In at least some embodiments, the topology update may include an indication that the first inter-medium bridging device is connected to one or more other domain. In at least some embodiments, upon detecting a loop, the first inter-medium bridging device may re-evaluate the loop each time a domain master (DM) routing update is received, and, upon detecting that loop forming routes have been removed in the routing update, the first inter-medium device may wait for a random amount of time and advertise conflicting routes to the DM if another node does not add the conflicting routes before the a random amount of time expires.

Additionally, process 1000 may further comprise: receiving, by the first inter-medium bridging device, a routing message from the first domain master, the routing message including a topology update; and enabling, by the first inter-medium bridging device, broadcast forwarding in response to all domain crossing routes of the first inter-medium bridging device being included in the routing message and no loop-forming route being included for another node.

Additionally, process 1000 may further comprise: identifying, by the first inter-medium bridging device, one or more conflicting MAC address indicated by the first domain master to be attached to the first inter-medium bridging device and to one or more other inter-medium bridging devices; and enabling, by the first inter-medium bridging device, broadcast forwarding in response to routes of the first inter-medium bridging device being included in the routing message and no loop-forming route being included for another node.

Additionally, process 1000 may further comprise: enabling, by the first inter-medium bridging device, the forwarding of broadcast packets from a first domain to a second domain when: a loop is detected but not all conflicting MAC addresses are removed by the second inter-medium bridging device; and the first inter-medium device has a lowest bit reversed MAC address of inter-medium bridging devices involved in the loop.

In at least some embodiments, process 1000 may further comprise detecting, by a first domain master, a loop formed by multiple inter-medium bridging devices that are connected to a respective domain of the first domain master by examining local AAT entries for all nodes to find MAC addresses that are included in address association tables (AAT) of multiple nodes. Process 1000 may also perform either or both of: instructing one or more inter-medium bridging devices to disable forwarding of broadcast packets between domains if a loop exists; and removing, via a routing update message, a particular route to a MAC address located in another domain from a first inter-medium bridging device if the particular route also exists to the same MAC address through a second inter-medium bridging device.

In at least some embodiments, process 1000 may further comprise receiving, by the first inter-medium bridging device, a topology update request message from the first domain master requesting for cross-domain topology information. Process 1000 may also comprise transmitting, by the first inter-medium bridging device, a topology update confirmation message to the first domain master, the topology update confirmation message comprising information indicative of: a type of inter-medium bridging device of the first inter-medium bridging device; a respective domain ID of each of the connected one or more other domain; a respective MAC address of the domain master of each of the connected one or more other domain; a metric that defines a cost for routing to each domain associated with the first inter-medium bridging device; a list of MAC addresses that resides above the application interface of the first inter-medium bridging device; and a list of MAC addresses that belong to each domain when more than one other domain is connected to the first inter-medium bridging device.

In at least some embodiments, in detecting a loop, process 1000 may explicitly detect a loop by: (1) transmitting, by the first inter-medium bridging device, a predefined indication to each of a plurality of domains to which the first inter-medium bridging device is connected (for example, the predefined indication may include the DID and one or more DAs of the first inter-medium bridging device, and, further, in some instances the DAs included in the predefined indication are all the DAs of the nodes of the first inter-medium bridging device); (2) receiving, by the first inter-medium bridging device, a predefined response from at least one node of at least one other inter-medium bridging device on at least one of the domains, the predefined response including the DID and DA of the at least one other inter-medium bridging device and, further, in some instances the DAs included in the predefined response are all the DAs of the nodes of the at least one other inter-medium bridging device; and (3) exchanging, by the first inter-medium bridging device, network topology messages with the at least one other inter-medium bridging device. In at least some embodiments, the network topology messages may include a list of MAC addresses connected to an A-interface of the first inter-medium bridging device and a list of MAC addresses in other domains that are directly addressable (i.e., without going through additional inter-domain IMBs). In at least some embodiments, the network topology messages may include: a type of inter-domain bridging/inter-medium bridging of the first inter-medium bridging device; a domain ID of one or more domains connected to the first inter-medium bridging device; a metric for each domain, connected to the first inter-medium bridging device, that defines a cost for routing to that domain through the first inter-medium bridging device; and a list of MAC addresses that belong to each domain connected to the first inter-medium bridging device, along with a metric per MAC address that defines a cost for routing to that MAC address through the first inter-medium bridging device. In at least some embodiments, the type of inter-domain bridging/inter-medium bridging of the first inter-medium bridging device may be a single-PHY IMB, a multi-PHY IMB, a switching IDB, or a routing IDB.

In at least some embodiments, process 1000 may further comprise determining, by the first inter-medium bridging device, a shortest path to each MAC address based on a number of inter-medium bridges to be traversed to reach the each MAC address. Process 1000 may also comprise reporting to the first domain master a particular route to each MAC address through the first inter-medium device if the particular route through the first inter-medium device is the shortest. Additionally, process 1000 may comprise: determining, by the first inter-medium bridging device, a shortest path to each MAC address based on comparing the metric communicated by each inter-medium device in the network topology messages; and reporting to the first domain master a particular route to each MAC address through the first inter-medium device if the particular route through the first inter-medium device is the shortest.

In at least some embodiments, process 1000 may further comprise enabling, by the first inter-medium bridging device, the forwarding of broadcast packets from a first domain to a second domain when no loop is detected or when a loop is detected but the first inter-medium device has the node with the lowest bit reversed MAC address of the inter-medium bridging devices involved in the loop.

In at least some embodiments, each of the plurality of physical mediums may operate as a respective G.hn domain. Process 1000 may further comprise relaying, by the first inter-medium bridging device, messages between domains by: modifying an OriginatingNode field of a Logical Link Control (LLC) frame header of a message in the first domain to match a device identifier (DID) of the first inter-medium bridging device in the second domain; and modifying a Destination Node field of the LLC frame header of the message to match a DID of the destination node in the second domain; and transmitting the message in the second domain when a transmission opportunity exists. Additionally, process 1000 may comprise: decrypting, by the first inter-medium device, a message based on an encryption key associated with the first domain; and encrypting, by the first inter-medium device, the message based on an encryption key associated with the second domain before transmitting the message in the second domain.

Figure 11:
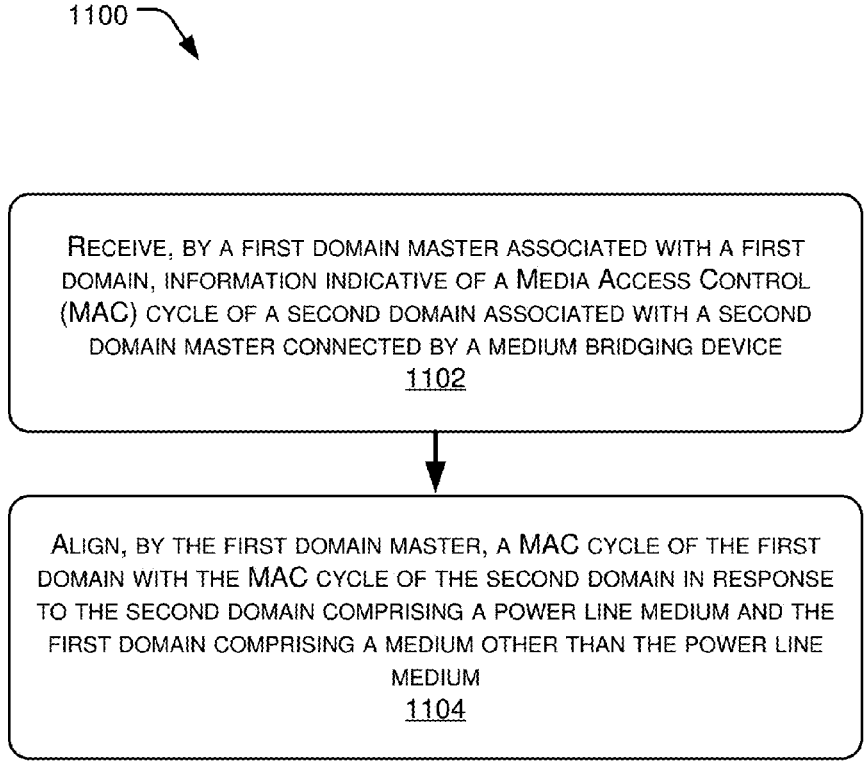
FIG. 11 is a flowchart of a process 1100 of multi-medium domain coordination in accordance with an embodiment of the present disclosure.

FIG. 11 illustrates a process 1100 of multi-medium domain coordination in accordance with an embodiment of the present disclosure.

Example process 1100 includes one or more operations, actions, or functions as illustrated by one or more of blocks 1102 and 1104. Although illustrated as discrete blocks, various blocks may be divided into additional blocks, combined into fewer blocks, or eliminated, depending on the desired implementation. Process 1100 may be implemented in one or more scenarios as depicted in one or more of FIGS. 2-9. Further, process 1100 may be implemented by software, firmware, hardware, or any combination thereof in an integrated-circuit processor, a chipset or a communication device. For illustrative purposes, the operations described below are performed by a processor or integrated circuit of a communication device, referred to as a first domain master in the embodiments described herein. Process 1100 may begin at block 1102.

At 1102, the first domain master associated with a first domain may receive information indicative of a Media Access Control (MAC) cycle of a second domain associated with a second domain master connected by a medium bridging device. The first domain is associated with a first medium and the second domain is associated with a second medium such that the first medium and the second medium are separate communications channels.

At 1104, the first domain master may align a MAC cycle of the first domain with the MAC cycle of the second domain in response to the second domain being a power line medium and the first domain not being the power line medium.

In at least some embodiments, process 1100 may further comprise: tracking, by the inter-medium bridging device, network timing references (NTR) of a plurality of domains connected to the inter-medium device; and transmitting, by the inter-medium bridging device, timing information to each of the domain masters of the plurality of domains, the timing information including an offset indicative of a difference between the network timing reference of that domain and one or more other domains, a starting network timing reference value for the MAC cycle of one or more other domains, and a duration of the MAC cycle of one or more other domains. The inter-medium bridging device may be registered in the plurality of domains.

In at least some embodiments, in aligning the MAC cycle of first domain to the MAC cycle of a second domain, process 1100 may perform operations comprising: determining, by the first domain master, a periodic start and end times of the MAC cycle of the second domain based on the timing information sent from the inter-medium device; and adjusting, over one or more MAC cycles by the first domain master, the MAC cycle of the first domain to match a periodic start and end times of the MAC cycle of the second domain.

In at least some embodiments, process 1100 may further comprise: aligning, by the first domain master, the MAC cycle of the first domain with the MAC cycle of the second domain and a MAC cycle of one or more additional domains associated with one or more additional domain masters using a neighborhood domain MAC cycle alignment method of the G.9961 standards in response to each of the first domain, the second domain, and the one or more additional domains comprising a respective power line medium.

In at least some embodiments, process 1100 may further comprise: aligning, by the first domain master, the MAC cycle of the first domain with the MAC cycle of the second domain or a MAC cycle of one or more additional domains in response to each of the second domain and the one or more additional domains comprising a respective power line medium while the first domain does not comprise a power line medium.

In at least some embodiments, process 1100 may further comprise: aligning, by the first domain master, the MAC cycle of the first domain to the MAC cycle of the second domain whichever has a longer duration in response to none of the domains comprising a power line medium.

In at least some embodiments, process 1100 may further comprise: aligning, by the first domain master, the MAC cycle of the first domain with the second domain whichever has the lowest bit reversed MAC address for the respective domain master in response to a duration of the MAC cycle of the first domain and a duration of the MAC cycle of the second domain being equal when neither the first domain nor the second domain comprises a power line medium.

Figure 12:
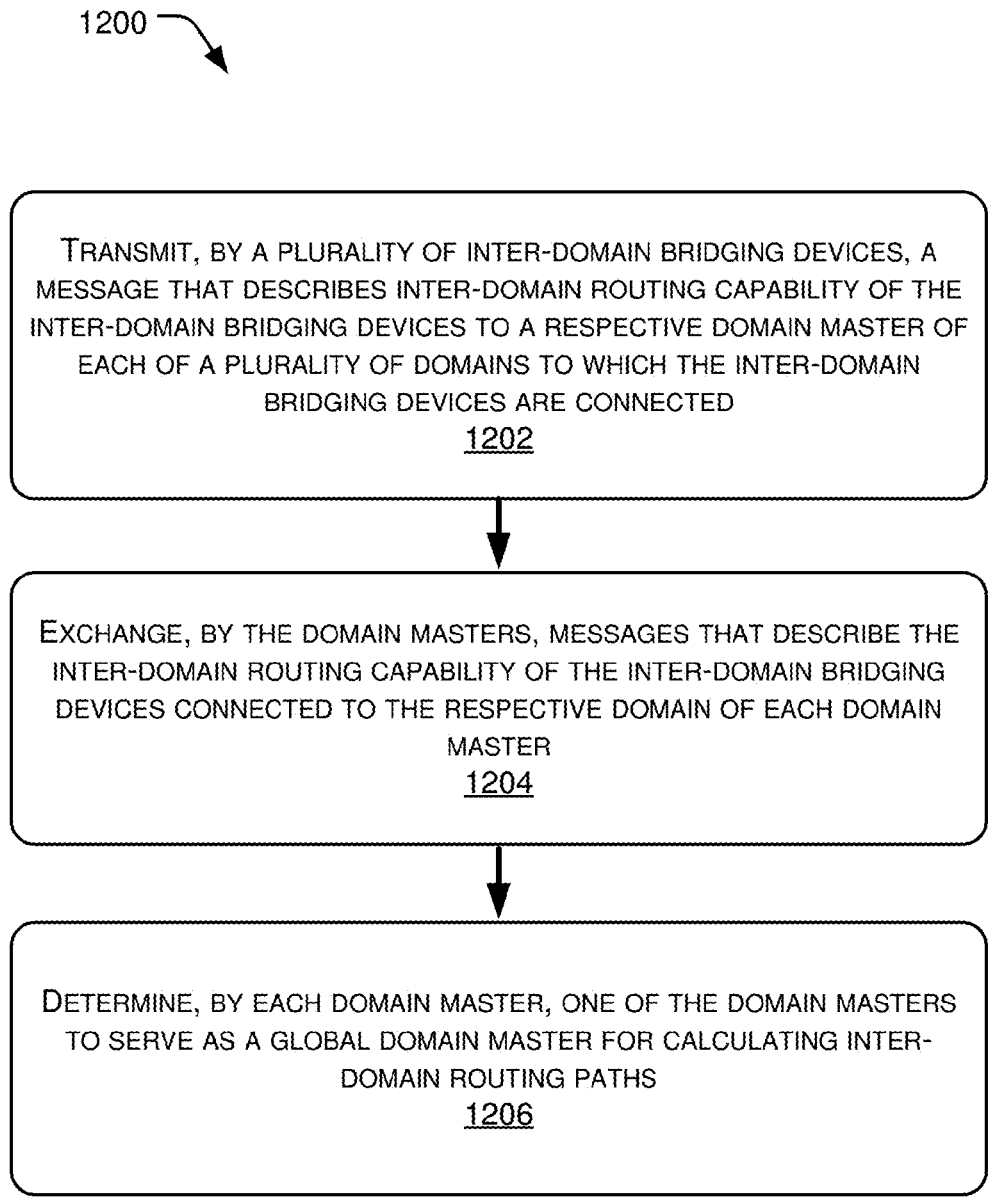
FIG. 12 is a flowchart of a process 1200 of multi-medium domain coordination in accordance with another embodiment of the present disclosure.

FIG. 12 illustrates a process 1200 of multi-medium domain coordination in accordance with an embodiment of the present disclosure.

Example process 1200 includes one or more operations, actions, or functions as illustrated by one or more of blocks 1202, 1204 and 1206. Although illustrated as discrete blocks, various blocks may be divided into additional blocks, combined into fewer blocks, or eliminated, depending on the desired implementation. Process 1200 may be implemented in one or more scenarios as depicted in one or more of FIGS. 2-9. Further, process 1200 may be implemented by software, firmware, hardware, or any combination thereof in an integrated-circuit processor, a chipset or a communication device. For illustrative purposes, the operations described below are performed by a processor or integrated circuit of a communication device, referred to as a first domain master in the embodiments described herein. Process 1200 may begin at block 1202.

At 1202, multiple inter-domain bridging devices transmit a message that describes inter-domain routing capability of the inter-domain bridging devices to a respective domain master of each of a plurality of domains to which the inter-domain bridging devices are connected.

At 1204, the domain masters exchange messages that describe the inter-domain routing capability of the plurality of inter-domain bridging devices connected to the respective domain of each domain master.

At 1206, each domain master determines one of the domain masters to serve as a global domain master for calculating inter-domain routing paths.

In at least some embodiments, the messages exchanged may include: a type of inter-domain bridge (IDB)/inter-medium bridge (IMB) indicative of a single-PHY IMB, a multi-PHY IMB, a switching IDB, or a G.hn routing IDB; a domain identifier of one or more connected domains; a MAC address of each of the connected one or more domain masters; a metric that defines a cost for routing to each domain of an IMB that sends one of the messages; a list of MAC addresses for an IMB that resides above an application interface rather than in a connected G.hn domain; and if more than one connected domain, a list of MAC addresses that belong to each domain.

In at least some embodiments, the global domain master may be configured to perform operations comprising: calculating, based on inter-domain metrics provided by each inter-domain bridging device, a lowest-cost path for routing between each pair of domains; selecting lowest-cost inter-domain routes; and communicating the selected lowest-cost inter-domain routes to each domain master.

Alternatively or additionally, the global domain master may be further configured to perform operations comprising: determining a fully connected inter-domain broadcast routing tree that does not form loops; and communicating to each domain master broadcast forwarding requirements for each inter-domain bridging device connected to the respective domain of the domain master.

Alternatively or additionally, the global domain master may be configured to perform operations comprising: calculating, based on inter-domain routing metrics provided by each inter-domain bridging device and intra-domain routing metrics provided by each domain master, a lowest-cost path for routing between each pair of nodes located in different domains; selecting lowest-cost inter-domain routes; and communicating to each domain master the selected lowest-cost inter-domain routes. In at least some embodiments, the global domain master may be further configured to perform operations comprising: determining a fully connected inter-domain broadcast routing tree that does not form loops originating from each node in the plurality of domains; and communicating to each domain master broadcast forwarding requirements for each inter-domain bridging device connected to the respective domain of the domain master for broadcast messages that originate from each node of the respective domain.

Example Processor

Figure 13:
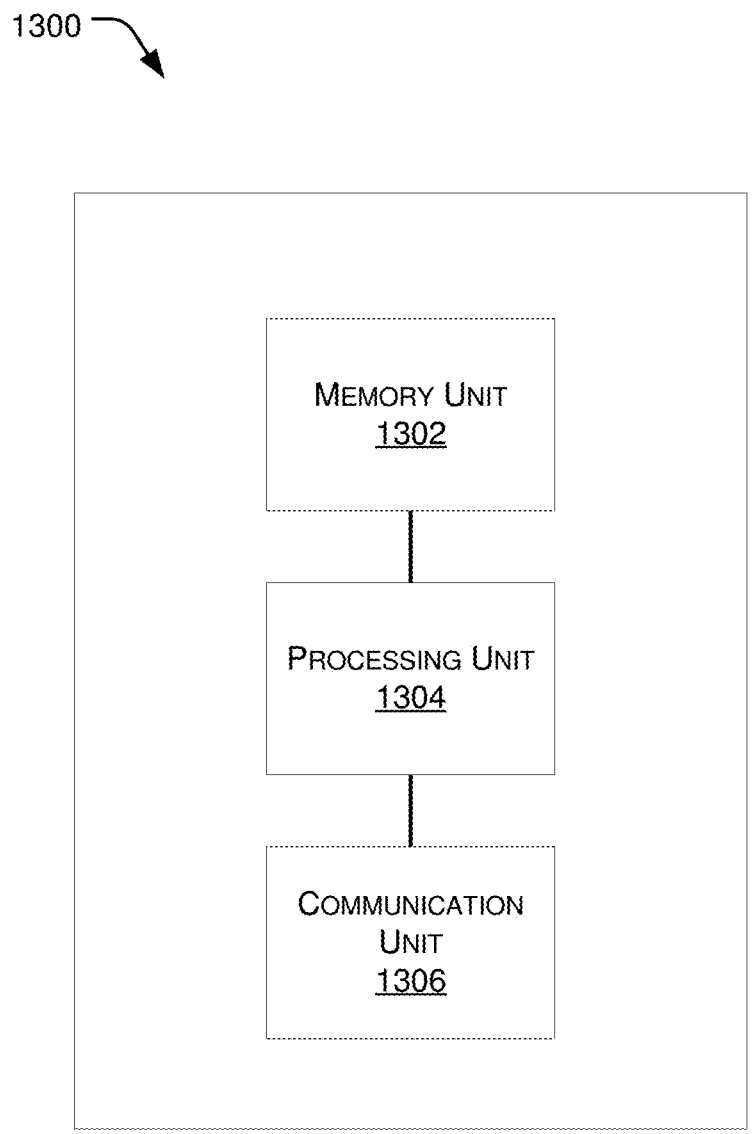
FIG. 13 is a block diagram of a communication device in accordance with an embodiment of the present disclosure.

FIG. 13 illustrates components of a communication device 1300 that is capable of performing operations in accordance with the present disclosure, including executing either or both of process 1000, process 1100 and/or any variation thereof. Communication device 1300 may be an integrated-circuit processor or a chipset, for example.

As shown in FIG. 13, the communication device 1300 comprises a memory unit 1302, a processing unit 1304, and a communication unit 1306. The memory unit 1302 is configured to store one or more sets of instructions therein. The processing unit 1304 is configured to execute the one or more sets of instructions stored in the memory unit 1302. The communication unit 1306 is configured to transmit data (e.g., packets) and receive data under the command of the processing unit 1304. Upon executing the one or more sets of instructions stored in the memory unit 1302, the processing unit 1304 carries out executing one or more of process 1000, process 1100, process 1200 and/or any variation thereof.

Additional and Alternative Implementation Notes

The above-described techniques pertain to inter-medium bridging. Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventor intends the described embodiments to be primarily examples. The inventor does not intend these embodiments to limit the scope of the appended claims. Rather, the inventor has contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method, comprising:
    transmitting, by a plurality of inter-domain bridging devices, a message that describes inter-domain routing capability of the inter-domain bridging devices to a respective domain master of each of a plurality domains to which the inter-domain bridging devices are connected;
    exchanging, by the plurality of domain masters, messages that describe the inter-domain routing capability of the plurality of inter-domain bridging devices connected to the respective domain of each domain master; and
    determining, by each domain master, one of the domain masters to serve as a global domain master for calculating inter-domain routing paths and deciding which one or more of the inter-domain bridging devices to use for routing.

2. The method of claim 1, wherein the messages exchanged comprise:
    a type of inter-domain bridge (IDB)/inter-medium bridge (IMB) indicative of a single-PHY IMB, a multi-PHY IMB, a switching IDB, or a G.hn routing IDB;
    a domain identifier of one or more connected domains;
    a MAC address of each of the connected one or more domain masters;
    a metric that defines a cost for routing to each domain of an IMB that sends one of the messages;
    a list of MAC addresses for an IMB that resides above an application interface rather than in a connected G.hn domain; and if more than one connected domain, a list of MAC addresses that belong to each domain.

3. The method of claim 1, wherein the global domain master is configured to perform operations comprising:
calculating, based on inter-domain metrics provided by each inter-domain bridging device, a lowest-cost path for routing between each pair of domains; selecting lowest-cost inter-domain routes; and
communicating the selected lowest-cost inter-domain routes to each domain master.

4. The method of 3, wherein the global domain master is further configured to perform operations comprising:
determining a fully connected inter-domain broadcast routing tree that does not form loops; and
communicating to each domain master broadcast forwarding requirements for each inter-domain bridging device connected to the respective domain of the domain master.

5. The method of claim 1, wherein the global domain master is configured to perform operations comprising:
calculating, based on inter-domain routing metrics provided by each inter-domain bridging device and intra-domain routing metrics provided by each domain master, a lowest-cost path for routing between each pair of nodes located in different domains;
selecting lowest-cost inter-domain routes; and
communicating to each domain master the selected lowest-cost inter-domain routes.

6. The method of 5, wherein the global domain master is further configured to perform operations comprising:
determining a fully connected inter-domain broadcast routing tree that does not form loops originating from each node in the plurality of domains; and
communicating to each domain master broadcast forwarding requirements for each inter-domain bridging device connected to the respective domain of the domain master for broadcast messages that originate from each node of the respective domain.

7. A method, comprising:
transmitting, by a plurality of inter-domain bridging devices, a message that describes inter-domain routing capability of the inter-domain bridging devices to a respective domain master of each of a plurality domains to which the inter-domain bridging devices are connected;
exchanging, by the plurality of domain masters, messages that describe the inter-domain routing capability of the plurality of inter-domain bridging devices connected to the respective domain of each domain master; and
determining, by each domain master, one of the domain masters to serve as a global domain master for calculating inter-domain routing paths,
wherein the messages exchanged comprise one or more of:
a type of inter-domain bridge (IDB/inter-medium bridge (IMB) indicative of a single-PHY IMB, a multi-PHY IMB, a switching IDB, or a G.hn routing IDB;
domain identifier of one or more connected domains;
a MAC address of each of the connected one or more domain masters;
a metric that defines a cost for routing to each domain of an IMB that sends one of the messages;
a list of MAC addresses for an IMB that resides above an application interface rather than in a connected G.hn domain; and
if more than one connected domain, a list of MAC addresses that belong to each domain.

8. The method of claim 7, wherein the global domain master is configured to perform operations comprising:
calculating, based on inter-domain metrics provided by each inter-domain bridging device, a lowest-cost path for routing between each pair of domains; selecting lowest-cost inter-domain routes; and
communicating the selected lowest-cost inter-domain routes to each domain master.

9. The method of 8, wherein the global domain master is further configured to perform operations comprising:
determining a fully connected inter-domain broadcast routing tree that does not form loops; and
communicating to each domain master broadcast forwarding requirements for each inter-domain bridging device connected to the respective domain of the domain master.

10. The method of claim 7, wherein the global domain master is configured to perform operations comprising:
calculating, based on inter-domain routing metrics provided by each inter-domain bridging device and intra-domain routing metrics provided by each domain master, a lowest-cost path for routing between each pair of nodes located in different domains;
selecting lowest-cost inter-domain routes; and
communicating to each domain master the selected lowest-cost inter-domain routes.

11. The method of 10, wherein the global domain master is further configured to perform operations comprising:
determining a fully connected inter-domain broadcast routing tree that does not form loops originating from each node in the plurality of domains; and
communicating to each domain master broadcast forwarding requirements for each inter-domain bridging device connected to the respective domain of the domain master for broadcast messages that originate from each node of the respective domain.

* * * * *